(12) United States Patent
Giardino et al.

(10) Patent No.: US 11,542,147 B2
(45) Date of Patent: Jan. 3, 2023

(54) BEVERAGE DISPENSERS WITH HEAT EXCHANGERS

(71) Applicant: Cornelius, Inc., Osseo, MN (US)

(72) Inventors: Nicholas Michael Giardino, South Elgin, IL (US); Michael Thomas Marszalek, Bolingbrook, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 0 days.

(21) Appl. No.: 17/038,771

(22) Filed: Sep. 30, 2020

(65) Prior Publication Data

US 2021/0094815 A1 Apr. 1, 2021

Related U.S. Application Data

(60) Provisional application No. 62/907,913, filed on Sep. 30, 2019.

(51) Int. Cl.
*B67D 1/00* (2006.01)
*B67D 1/08* (2006.01)
(Continued)

(52) U.S. Cl.
CPC .......... *B67D 1/0884* (2013.01); *B67D 1/004* (2013.01); *B67D 1/0015* (2013.01); *B67D 1/0022* (2013.01); *B67D 1/0864* (2013.01); *B67D 1/0867* (2013.01); *B67D 1/0888* (2013.01); *F25B 39/02* (2013.01); *F25D 16/00* (2013.01);
(Continued)

(58) Field of Classification Search
CPC .. B67D 1/0884; B67D 1/0015; B67D 1/0867; B67D 2210/00049; B67D 2210/00104; B67D 1/0022; B67D 1/004; B67D 1/0864; B67D 1/0888; F25D 16/00; F25D 31/002; F25D 31/003; F25B 2700/21171; F25B 25/005; F25B 39/02; F28D 2020/0021; F28D 2021/0042; F28D 2021/0071; F28D 1/0213; F28D 1/0477; F28D 20/021; Y02E 60/14
See application file for complete search history.

(56) References Cited

U.S. PATENT DOCUMENTS 4,754,609 A * 7/1988 Black ................... B67D 1/0057
62/200
4,907,417 A * 3/1990 Forsythe .............. B67D 1/0864
62/199
(Continued)

FOREIGN PATENT DOCUMENTS

EP 2 842 778 3/2015

*Primary Examiner* — Frederick C Nicolas
(74) *Attorney, Agent, or Firm* — Andrus Intellectual Property Law, LLP

(57) ABSTRACT

A method for cooling a mixed beverage formed with one or more beverage components includes circulating a refrigerant through a heat exchanger having a phase change material to cool a beverage component and sensing a temperature of the refrigerant. The method further includes detecting a first instance when the sensed temperature of the refrigerant equals a threshold refrigerant temperature, detecting a second instance when the sensed temperature of the refrigerant equals the threshold refrigerant temperature, and stopping circulation of the refrigerant when the second instance is detected.

25 Claims, 21 Drawing Sheets

(51) Int. Cl.
*F25D 16/00* (2006.01)
*F25D 31/00* (2006.01)
*F28D 1/047* (2006.01)
*F28D 1/02* (2006.01)
*F28D 20/02* (2006.01)
*F25B 39/02* (2006.01)
*F28D 21/00* (2006.01)
*F28D 20/00* (2006.01)
*F25B 25/00* (2006.01)

(52) U.S. Cl.
CPC ......... *F25D 31/002* (2013.01); *F25D 31/003* (2013.01); *F28D 1/0213* (2013.01); *F28D 1/0477* (2013.01); *F28D 20/021* (2013.01); *B67D 2210/00049* (2013.01); *B67D 2210/00104* (2013.01); *F25B 25/005* (2013.01); *F25B 2700/21171* (2013.01); *F28D 2020/0021* (2013.01); *F28D 2021/0042* (2013.01); *F28D 2021/0071* (2013.01); *Y02E 60/14* (2013.01)

(56) References Cited

U.S. PATENT DOCUMENTS

| | | | |
|---|---|---|---|
| 5,220,954 A | 6/1993 | Longardner et al. | |
| 5,363,671 A * | 11/1994 | Forsythe | F25C 1/04 62/197 |
| 5,372,014 A * | 12/1994 | Adams | B67D 1/0867 62/119 |
| 5,456,387 A * | 10/1995 | Trewhella | B67D 3/0029 222/146.6 |
| 5,487,492 A | 1/1996 | Goulet | |
| 6,220,047 B1 | 4/2001 | Vogel et al. | |
| 6,374,622 B1 | 4/2002 | Zhang et al. | |
| 6,400,896 B1 | 6/2002 | Longardner | |
| 8,408,017 B2 | 4/2013 | Leaver et al. | |
| 9,016,070 B2 * | 4/2015 | Boarman | F25D 11/006 62/3.6 |
| 9,410,724 B2 | 8/2016 | Sadot et al. | |
| 9,823,002 B1 * | 11/2017 | Delgado | F25D 31/002 |
| 11,161,730 B1 * | 11/2021 | Volftsun | B67D 1/0888 |
| 2004/0244398 A1 * | 12/2004 | Radermacher | E03B 3/28 62/285 |
| 2005/0109056 A1 * | 5/2005 | Rand | F25C 5/10 62/340 |
| 2007/0193291 A1 * | 8/2007 | Reddin | B60H 1/00357 62/239 |
| 2007/0277539 A1 * | 12/2007 | Kim | F25D 17/045 62/153 |
| 2009/0266094 A1 | 10/2009 | Major et al. | |
| 2010/0024452 A1 * | 2/2010 | Lifson | F25D 21/06 62/154 |
| 2010/0276451 A1 * | 11/2010 | Tachibana | B67D 1/0888 222/129.1 |
| 2013/0276469 A1 * | 10/2013 | Dryzun | F25D 31/003 62/186 |
| 2014/0075963 A1 | 3/2014 | Boarman | |
| 2017/0035236 A1 * | 2/2017 | Zhao | F25D 29/008 |
| 2017/0176077 A1 * | 6/2017 | Knatt | F25B 39/02 |
| 2017/0292781 A1 * | 10/2017 | Pandeya | F25D 16/00 |
| 2017/0305734 A1 * | 10/2017 | Nachawati | F25D 23/006 |
| 2018/0209716 A1 * | 7/2018 | Jain | F25D 3/02 |
| 2018/0289035 A1 * | 10/2018 | Cocchi | A23G 9/224 |

* cited by examiner

BEVERAGE DISPENSERS WITH HEAT EXCHANGERS

CROSS-REFERENCE TO RELATED APPLICATION

The present disclosure is based on and claims priority to U.S. Provisional Patent Application No. 62/907,913 filed Sep. 30, 2019, the disclosure of which is incorporated herein by reference.

FIELD

The present disclosure relates to dispensers for dispensing mixed beverages, and specifically to beverage dispensers that cool one or more fluids and mix the fluids to form the mixed beverage.

BACKGROUND

The following U.S. Patents are incorporated herein by reference in entirety.

U.S. Pat. No. 5,487,492 discloses a dispenser with a cold plate forming a bottom of an ice retaining bin. A bin liner is formed of two parts, a flat carbonator and a remaining U-shaped sheet metal wall structure. The carbonator and sheet metal structure when secured together form the bin liner, which, in turn, is secured to and around a perimeter edge of the cold plate and extends upward therefrom. In particular, the carbonator includes a flange integral therewith and extending from a portion of a perimeter edge thereof.

U.S. Pat. No. 6,220,047 discloses a dual-purpose carbonator/blending bottle connected to a source of beverage syrup, a source of potable water and to a source of pressurized carbon dioxide gas. The dual-purpose bottle is retained within an ice bank water bath tank.

U.S. Pat. No. 6,374,622 discloses an apparatus and method that regulates the size of an ice bank and prevents short cycling of the compressor.

U.S. Pat. No. 8,408,017 discloses a refrigeration system for a frozen product dispenser that is controlled to have a variable cooling capacity determined by variable cooling load demands of the dispenser.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one implementation of the present disclosure, a method for cooling a mixed beverage formed with one or more beverage components is provided. The method includes circulating a refrigerant through a heat exchanger having a phase change material to cool a beverage component and sensing a temperature of the refrigerant. The method further includes detecting a first instance when the sensed temperature of the refrigerant equals a threshold refrigerant temperature, detecting a second instance when the sensed temperature of the refrigerant equals the threshold refrigerant temperature, and stopping circulation of the refrigerant when the second instance is detected.

According to another implementation of the present disclosure, a method for cooling a mixed beverage formed with one or more beverage components is provided. The method includes conveying a beverage component through a heat exchanger having a phase change material to cool the beverage component and sensing a characteristic of the phase change material. The method further includes detecting a phase of the phase change material and circulating a refrigerant through the heat exchanger based on the phase of the phase change material to thereby cool the phase change material and the beverage component.

According to another implementation of the present disclosure, a dispenser for dispensing a mixed beverage that includes a heat exchanger having a phase change material is provided. The heat exchanger is configured to cool one or more beverage components that are mixed to form the mixed beverage. The dispenser includes a refrigeration system that is configured to cool a refrigerant and circulate the refrigerant through the heat exchanger to cool the beverage component, and a sensor that is configured to sense a characteristic of the phase change material. The dispenser further includes a controller operably coupled to the refrigeration system that is configured to control the refrigeration system to thereby circulate the refrigerant based on the characteristic of the phase change material.

According to yet another implementation of the present disclosure, a dispenser for dispensing a mixed beverage that includes a heat exchanger having a phase change material is provided. The heat exchanger is configured to cool one or more beverage components that are mixed to form the mixed beverage. The dispenser includes a refrigeration system that is configured to cool a refrigerant and circulate the refrigerant through the heat exchanger to cool the beverage component, and a sensor that is configured to sense temperature of the refrigerant. The dispenser further includes a controller operably coupled to the refrigeration system that is configured to control the refrigeration system to thereby circulate the refrigerant based on the temperature of the refrigerant.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Beverage dispensers are known to dispense mixed beverages that are formed by mixing one or more concentrates (e.g., soda syrup) with one or more base fluids (e.g., still water, carbonated water). The dispenser dispenses the mixed beverage into a receptacle, such as a cup, for consumption by the operator. The dispenser includes a cooling or refrigeration system that cools the concentrate and/or the base fluid before the concentrate and the base fluid are mixed together. For example, an ice bank refrigeration system cools the base fluid before the base fluid is mixed with the concentrate. The ice bank refrigeration system includes a tank that contains a volume of water as well as known refrigeration components such as an evaporator coil, a compressor, a pump, a cooling fan, an expansion valve and the like that operate together to cool the base fluid. The evaporator coil is submerged in the water and a refrigerant, such as glycol or R134a or R290 refrigerant, is circulated by the refrigeration system through the evaporator coil to cool the water in the tank. As the water is cooled, a portion of the water in the tank solidifies into ice that acts as a cooling reserve for cooling the base fluid when the refrigeration system is not operating. A beverage coil is also submerged in the water, and as the base fluid flows through the beverage coil, the ice and water in the tank cool the base fluid. Additional details regarding known beverage dispensers and systems thereof are provided in the above-incorporated U.S. Patents.

The present inventors have recognized that beverage dispensers with ice bank refrigeration systems are susceptible to problems such as evaporation of the water from the tank. As water evaporates from the tank, the efficiency of the ice bank refrigeration system decreases, the number or frequency of service/maintenance calls for the beverage dispenser increases, and/or the lifespan of certain refrigeration components decreases. Thus, the present inventors endeavored to develop beverage dispensers with heat exchangers that utilize fluids that are not susceptible to evaporation. Accordingly, the present inventors have developed the beverage dispensers described herein below that utilize Phase Change Material (PCM) in lieu of water to cool the beverage components that are mixed to form the mixed beverage.

Figure 1:
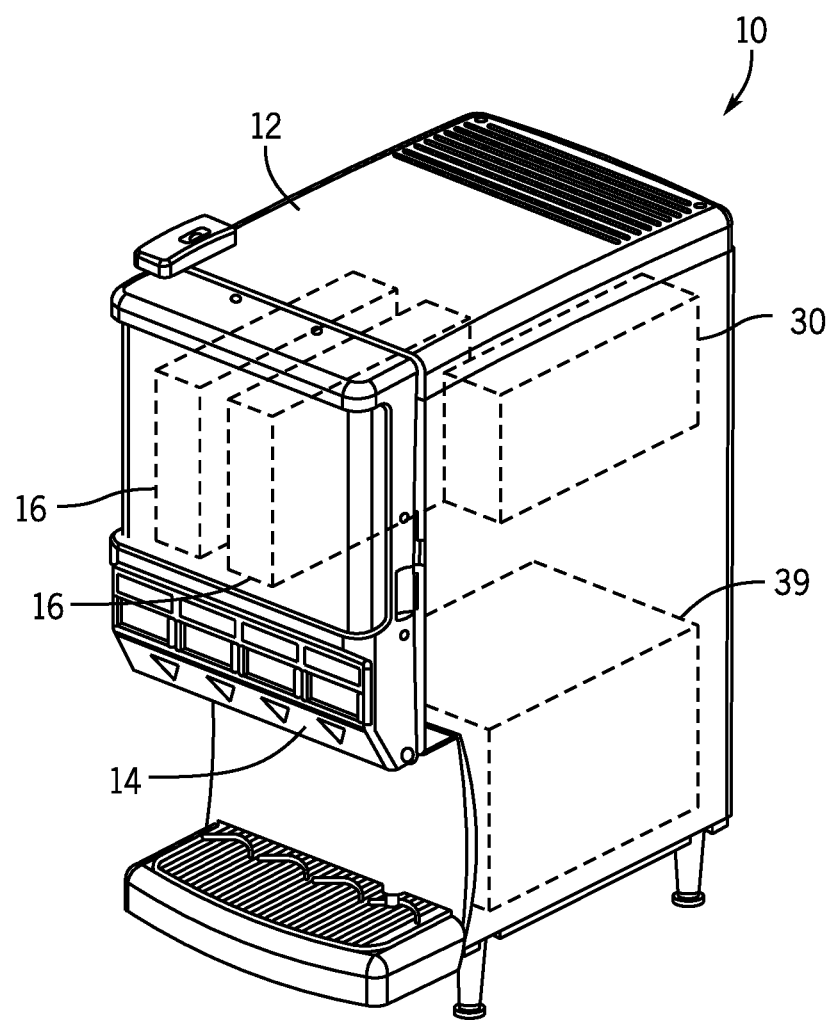
FIG. 1 is an example beverage dispenser according to the present disclosure.
Figure 2:
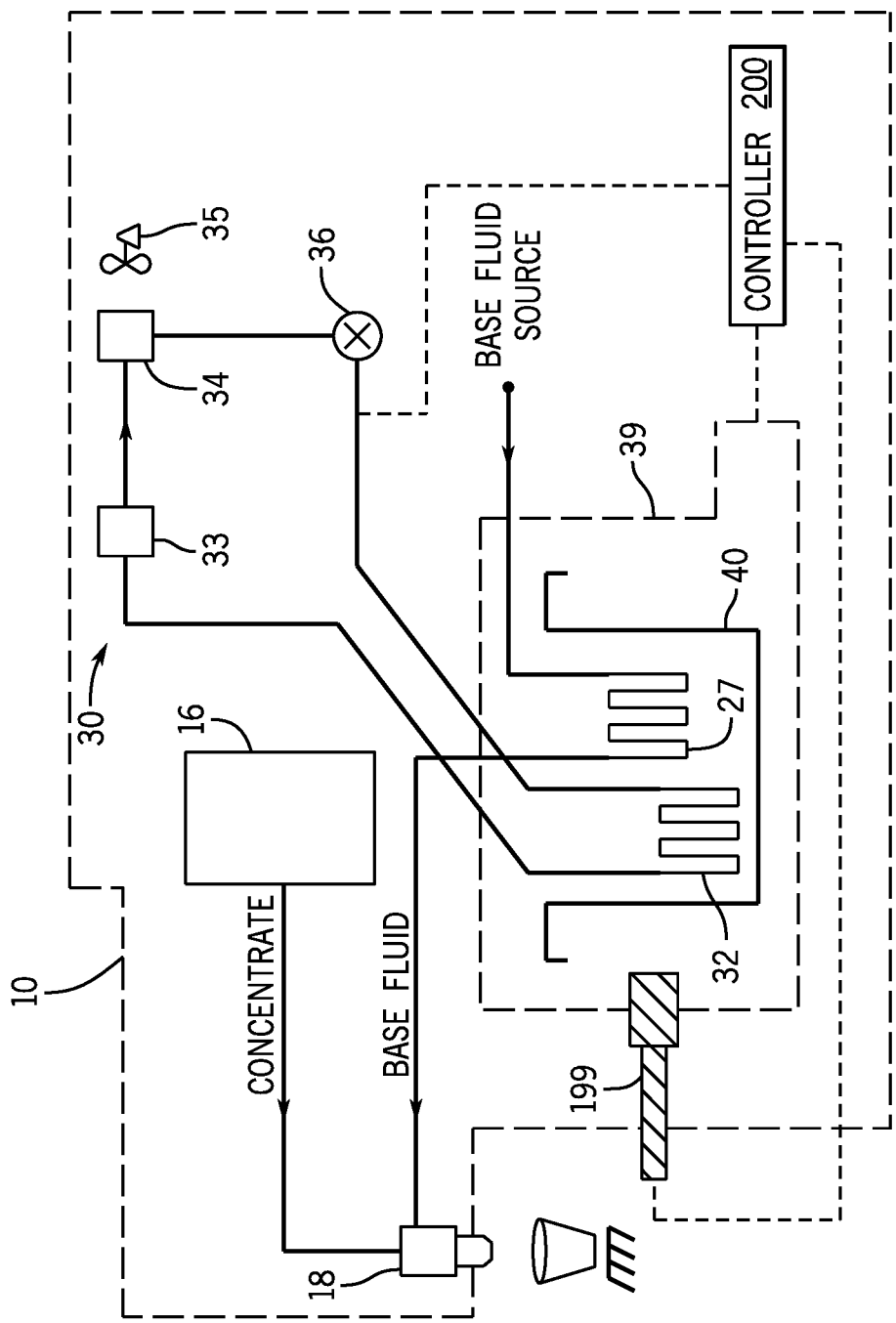
FIG. 2 is a schematic diagram of an example beverage dispenser according to the present disclosure.

FIGS. 1-2 disclose an example beverage dispenser 10 according to the present disclosure. The beverage dispenser 10 includes a housing 12 with a door 14 that is pivotable into an open position such that containers 16 (depicted in dashed lines) containing a concentrate, such as juice concentrate, can be positioned within the housing 12. The concentrate in each container 16 may correspond to a particular mixed beverage that is dispensed from the dispenser 10 (e.g., a container contains apple juice concentrate that is used to form an apple juice mixed beverage). The dispenser 10 receives a base fluid from a base fluid source (not shown), such as a pressurized water tank or a pressurized municipal water supply, and the base fluid flows through a beverage coil 27 (see FIG. 2) to one or more valve assemblies 18 (FIG. 2) that dispense appropriate amounts of the base fluid and the concentrate such that the desired mixed beverage is properly formed. For instance, a valve assembly 18 dispenses 1.0 oz/sec of the base fluid and 0.2 oz/sec of the concentrate such that the mixed beverage is formed with a base fluid to concentrate ratio of 5:1. Additional details regarding conventional valves, valve assemblies, and other conventional components of beverage dispensers are described in the above-incorporated U.S. Patents.

The dispenser 10 also includes a refrigeration system 30 that cools the base fluid before the valve assembly 18 dispenses the base fluid. Referring to FIG. 2, the refrigeration system 30 is connected to a heat exchanger 39 that includes a tank 40 that contains PCM (described in greater detail hereinbelow). The beverage coil 27 through which the base fluid flows is positioned in the tank 40, and at least partially submerged in the PCM. In addition to the beverage coil 27, an evaporator coil 32 of the refrigeration system 30 is also positioned in the tank 40 and at least partially submerged in the PCM. A compressor 33 pumps a refrigerant cooled by the refrigeration system 30 through the evaporator coil 32 such that the PCM and the beverage component are cooled. Specifically, heat transfers from the PCM to the refrigerant in the evaporator coil 32 such that the PCM is cooled by the refrigerant, and accordingly, the beverage component is cooled. The refrigeration system 30 may also include other known components, such as an evaporator coil 32, a condenser 34, a cooling fan 35, and an expansion valve 36.

As noted above, as the refrigeration system 30 circulates the refrigerant through the evaporator coil 32, the refrigerant cools the PCM in the tank 40. Continued cooling of the PCM causes the PCM to solidify or freeze. The solid or frozen portion of the PCM forms a cooling reserve for cooling the base fluid that flows through the beverage coil 27 when the refrigeration system 30 is not operating. The temperature at which the PCM begins to solidify can vary (e.g., the PCM begins to solidify at a temperature greater than 32.0 Fahrenheit, the PCM reaches a completely frozen state at a temperature greater than 32.0 F). A controller 200 (FIG. 30; described further herein) controls the refrigeration system 30 to thereby cool the PCM based on feedback from one or more sensors (described further herein). Thus, the refrigeration system 30 cools the PCM (via cooling and circulation of the refrigerant through the evaporator coil 32) to a preselected temperature that is greater than the freezing point of the base fluid thereby reducing the risk that the base fluid in the beverage coil 27 will freeze.

In certain examples, the refrigeration system 30 includes devices and components that increase the efficiency of the refrigeration system 30. In one example, the expansion valve 36, a capillary tube (not shown), or another pressure drop device of the refrigeration system 30 is configured to maintain a specific evaporator temperature and pressure to thereby maintain a desired rate of energy storage in the PCM. In another example, an evaporator pressure regulator valve is positioned at the outlet of the evaporator coil 32 and is configured to maintain high evaporator temperatures (e.g., a temperature in the range of 20.0-35.0 F) of the refrigerant such that a dual evaporator system can be utilized to also cool the air in the housing of the dispenser 10. In this example, a solenoid valve is utilized to stop or permit refrigerate to flow to the evaporator coil 32 as needed. In another example, an evaporator pressure regulator valve (EPRV) is provided and utilized to regulate flow of the refrigerant through the refrigeration system. In this example, the EPRV is located at the outlet of the evaporator coil 32 and upstream of a suction line heat exchanger device (not shown). The suction line heat exchanger device is configured to prevent refrigerant from flooding the compressor 33. An example conventional EPRV is commercially available from Parker Hannifin Corporation (model #139).

The PCM is a material that absorbs and releases thermal energy, and the PCM can freeze or solidify at temperatures that are different than the freezing point or temperature of water (~32.0° F.). Thus, the present inventors recognized that it is advantageous to utilize specific PCMs that have freezing or solidification temperatures that are greater than the freezing temperature of water. As such, the base fluid flowing through the beverage coil 27 does not freeze when the PCM is solid or frozen. For example, the PCM used in the beverage dispenser 10 of the present disclosure has a freezing or solidification temperature in the range of 32.0-45.0° F. In other examples, the PCM has a freezing or solidification temperature preferably in the range of 36.0-40.0° F. In yet another example, the PCM has a freezing or solidification temperature in the range of 34.0-36.0° F.

The specific PCM used with the beverage dispenser 10 can vary based on the application of the beverage dispenser 10. For example, PCM Products Ltd. commercially sells a PCM under the product name PLUSICE A4 (see also Appendix B). This PCM can be used in the example beverage dispensers 10 described above. This product has a boiling point of 250.0° C., a flash point of 99.0° C., a melting point of 4.0° C., and a relative density of 0.76 g/mL. Another example is PureTemp, LLC. which commercially sells a PCM under the product name PureTemp4 (see also Appendix C). This PCM can be used in the example beverage dispensers 10 described above. This product has a boiling point of 262.0° C., a flash point of 112.0° C., a melting point of 4.0° C., relative density of 0.87 g/mL, and a viscosity of 3.6 mm²/sec.

Through research and experimentation, the present inventors have discovered that dispensers 10 that use the PCM for cooling the base fluid (such as the dispenser 10 described above with respect to FIGS. 1-2) have several advantages over dispensers that use water for cooling the base fluid. For example, the PCM advantageously will not evaporate as quickly or as easily as water and the PCM is resistant to mold or bacteria growth. In addition, when the PCM is used to cool the base fluids, the pipes of the beverage coil can be placed in close proximity to the pipes of the evaporator coil. As such, the overall size of a dispenser that utilizes the PCM to cool the base fluid is smaller than dispensers that use water to cool the base fluid. In another example, the PCM has greater cooling capacity than water. For instance, dispensers that use the PCM to cool the base fluid can store less energy per unit mass than dispensers that use water to cool the base fluid (e.g., a PCM stores 200.0-300.0 joules/gram compared to water that stores 330.0 joules/gram). Furthermore, the risk that the base fluid in the beverage coil will freeze is reduced when the dispenser 10 uses the PCM to cool the base fluid because the PCM has a lower thermal conductivity than water. For instance, the PCM permits storage of energy at custom, selected temperatures (e.g., 36.0-40.0° F.) to thereby decrease the risk that the base fluid in the beverage coil 27 will freeze (e.g., the base fluid may freeze~32.0° F.).

The present inventors have further recognized that heat transfers into and out of the PCM differently than when heat transfers into and out of water. Thus, the interaction between the PCM and the evaporator coil 32 is different than the interaction between water and the evaporator coil 32. In certain examples, the PCM solidifies at different rates and accumulates differently in comparison to a dispenser that uses water. Thus, when the PCM is utilized in a beverage dispenser, the design and construction of the evaporator coil 32 and the beverage coil 27 must account for the unique characteristics of the PCM to thereby maximize the cooling of the base fluid and efficiency of the refrigeration system 30. The design factors that can be considered when designing a beverage dispenser that utilizes a PCM may include: wall thickness of the pipes that form the evaporator coil 32 and the beverage coil 27, outside diameter of the pipes that form the evaporator coil 32 and the beverage coil 27, material of the pipes that form the evaporator coil 32 and the beverage coil 27, and/or the spacing between the pipes of the evaporator coil 32 and the pipes of the beverage coil 27.

Figure 3:
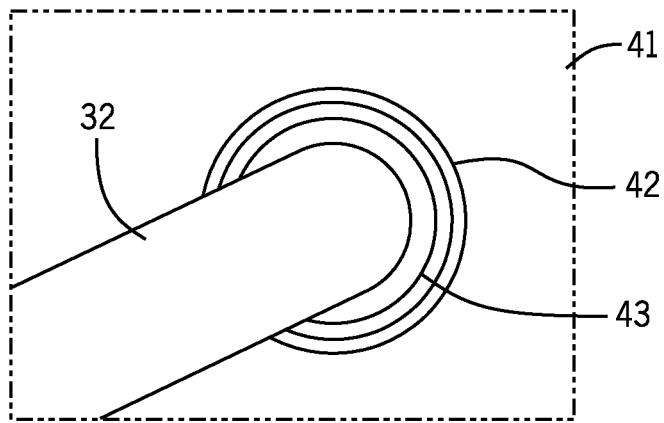
FIG. 3 is a graphical diagram of an evaporator coil passing through a Phase Change Material (PCM).

FIGS. 3-9 depict another example beverage dispenser 10 that utilizes PCM. FIG. 3 is a graphical representation of an evaporator coil 32 submerged in the PCM such that the PCM is cooled by the refrigerant flowing through the evaporator coil 32. The PCM in a first area 41 around the evaporator coil 32 is in a liquid state, and the PCM in a second area 43 is in a solid state. The PCM in a third area 42 between the first area 41 and the second area 43 is a liquid-solid transition state. The present inventors have determined that it is important to identify the area of the PCM around the evaporator coil 32 that is in a liquid-solid transition state so that the evaporator coil 32 and the beverage coil 27 (and the spacing therebetween) can be designed to maximize the cooling efficiency of the refrigeration system 30 (FIG. 2) and/or prevent the base fluid from freezing in the beverage coil 27.

Figure 4:
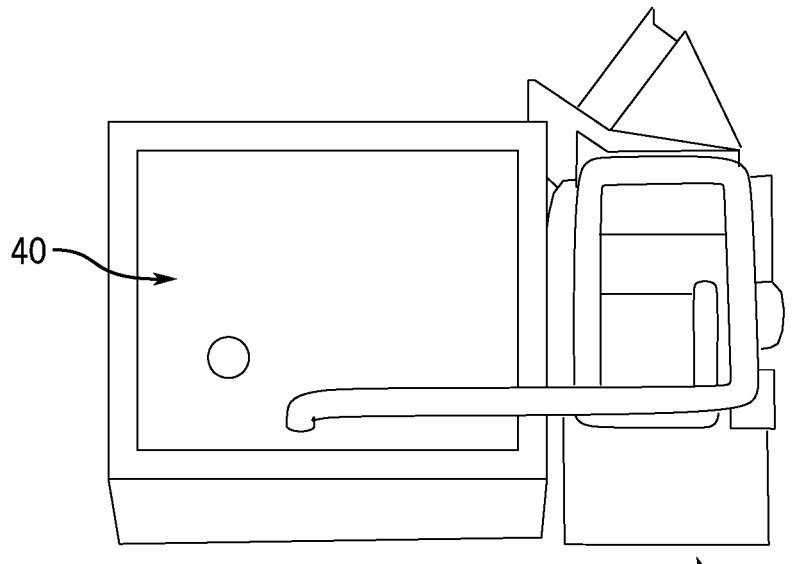
FIG. 4 is a top-down view of an example tank and refrigeration system of the present disclosure.
Figure 5:
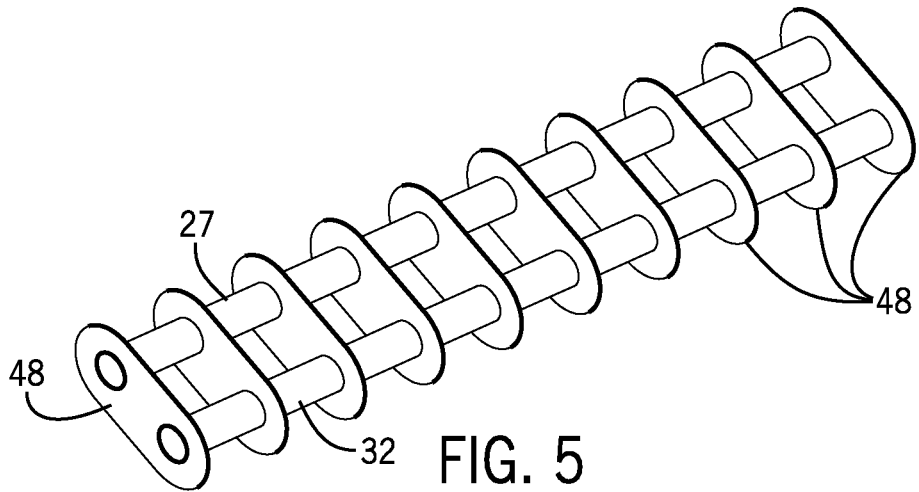
FIGS. 5-9 are various views of an example heat exchanger of the present disclosure that is located in the tank depicted in FIG. 4.
Figure 6:
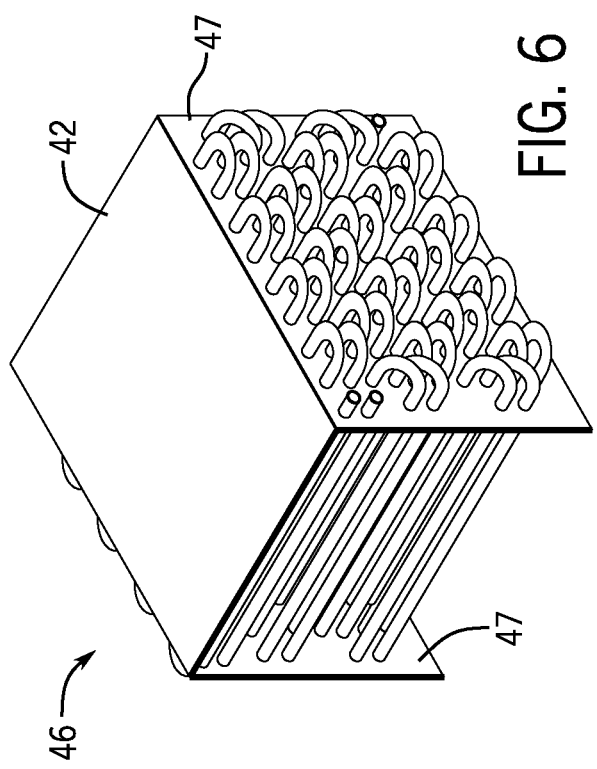
Figure 9:
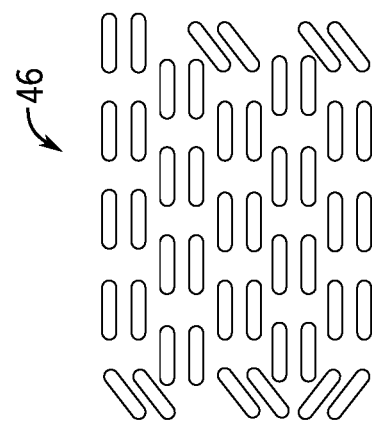
Figure 8:
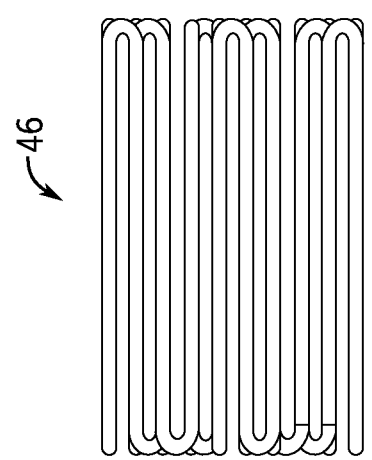
Figure 7:
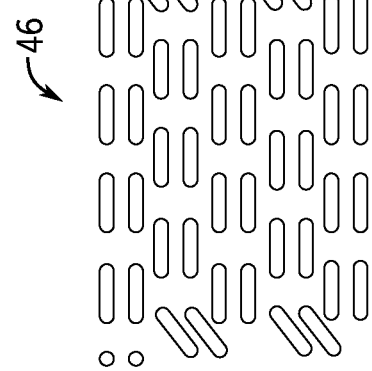
Figure 10:
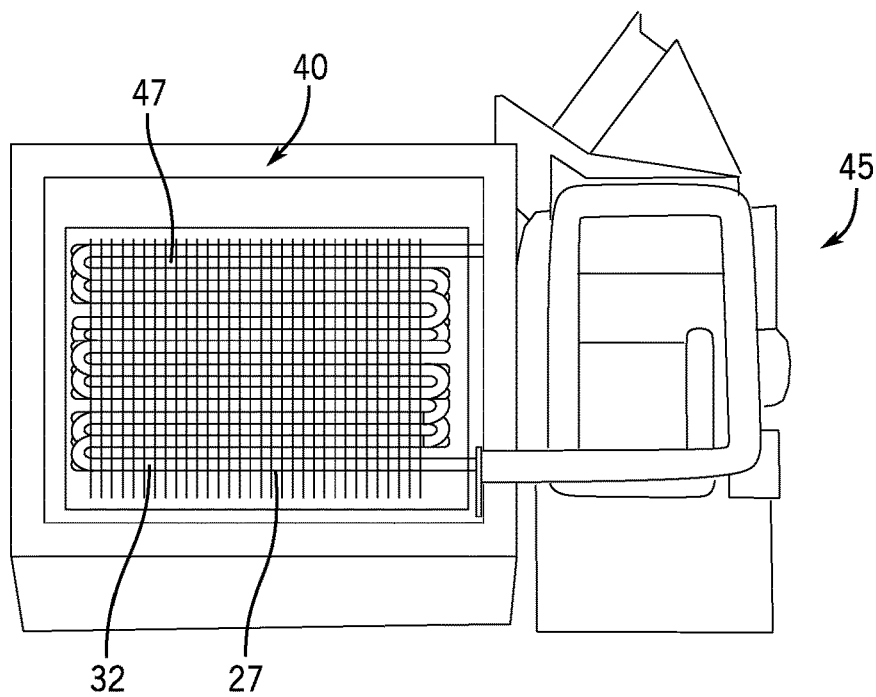
FIG. 10 is a perspective view of the heat exchanger of FIG. 6 located in the tank depicted in FIG. 4.
Figure 11:
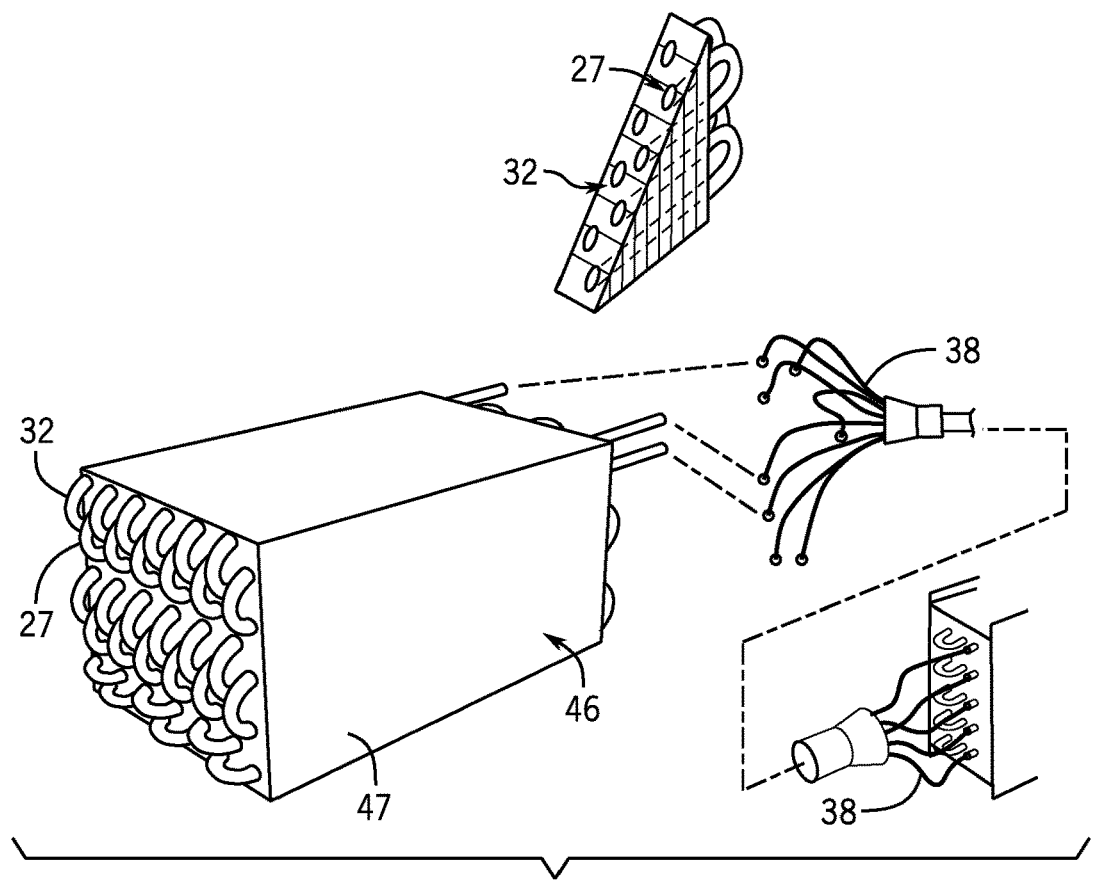
FIG. 11 are various views of other example heat exchanger according to the present disclosure.

FIG. 4 depicts an example tank 40 of the present disclosure with the evaporator coil 32 and the beverage coil 27 removed. Note that other components of the refrigeration system 30 (FIG. 2) are provided in a housing 45. FIGS. 5-9 depict an example heat exchanger 46, and the heat exchanger 46 (FIG. 6) has panels 47 with a plurality of holes through which the portions of the evaporator coil 32 and the beverage coil 27 (FIG. 5) extend. In this example, the beverage coil 27 is formed from stainless steel material and the evaporator coil 32 is formed from copper material. In certain examples, the pipes are coated with an anti-corrosion coating that does not inhibit or slow transfer of energy between the fluids. Referring to FIG. 5, a plurality of spacers 48 that hold and space the pipes of the evaporator coil 32 and the pipes of the beverage coil 27 apart from each other are depicted. FIG. 10 depicts the beverage coil 27, evaporator coil 32, and panels 47 of the heat exchanger 46 disposed in the tank 40 that contains the PCM. FIG. 11 depicts different views of other example heat exchangers according to the present disclosure. The heat exchangers depicted in FIG. 11 may be similar to the large heat exchangers utilized in buildings, with a manifold that distributes refrigerant to multiple pipes at once in order to minimize pressure drop. Note that in certain examples, a header connection 38 is configured to direct the flow of the refrigerant and the base fluid in the same direction into the heat exchanger 46.

Figure 12:
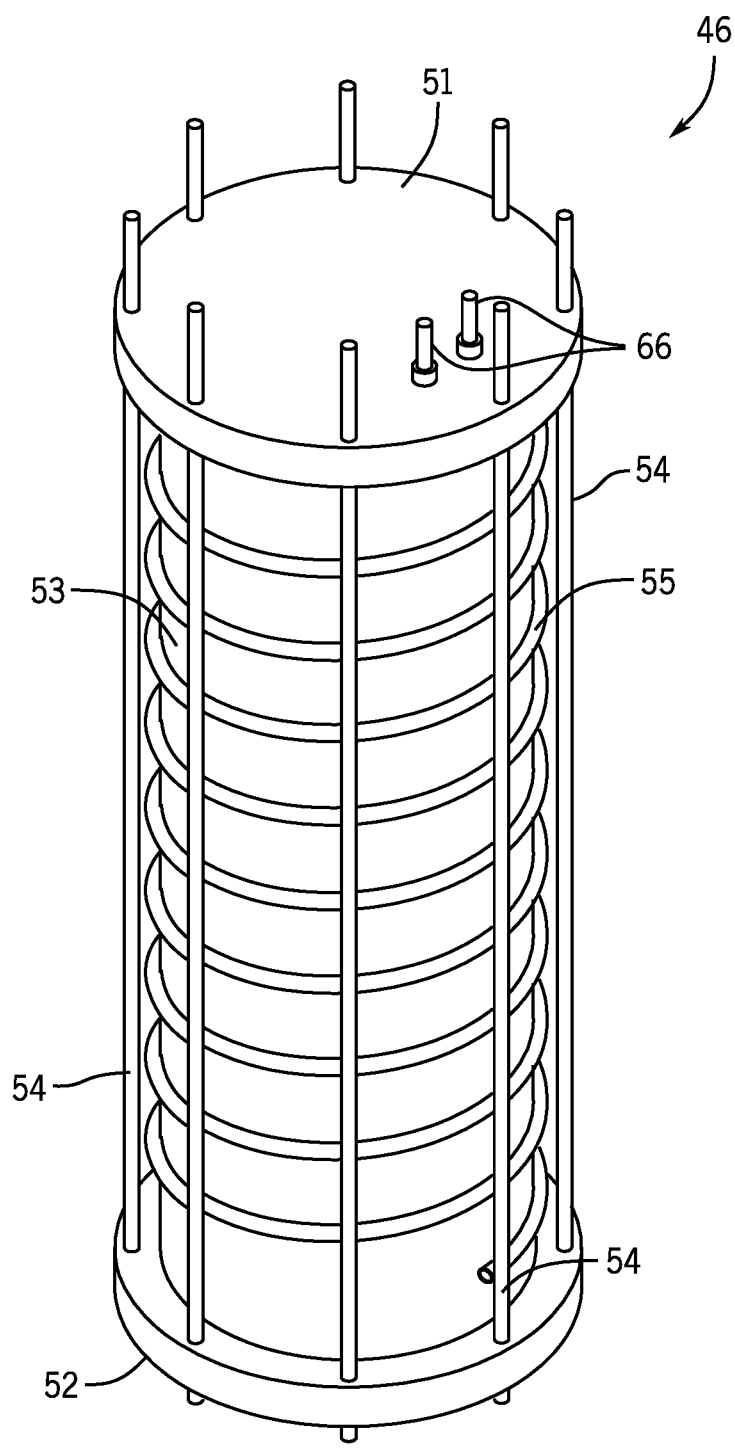
FIGS. 12-21 are various views of another example heat exchanger according to the present disclosure.
Figure 13:
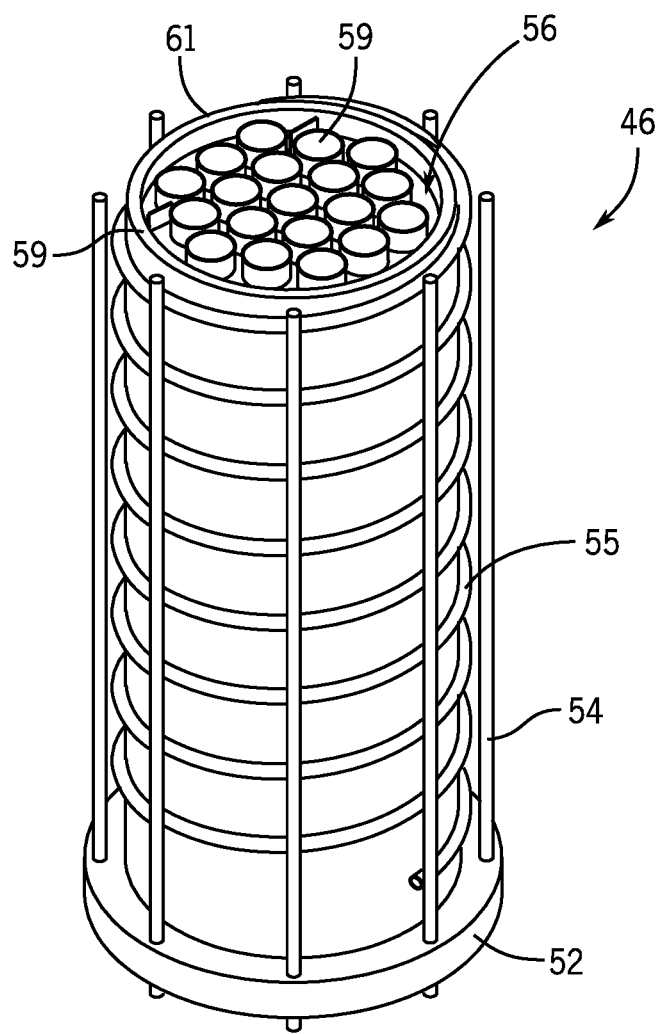
Figure 14:
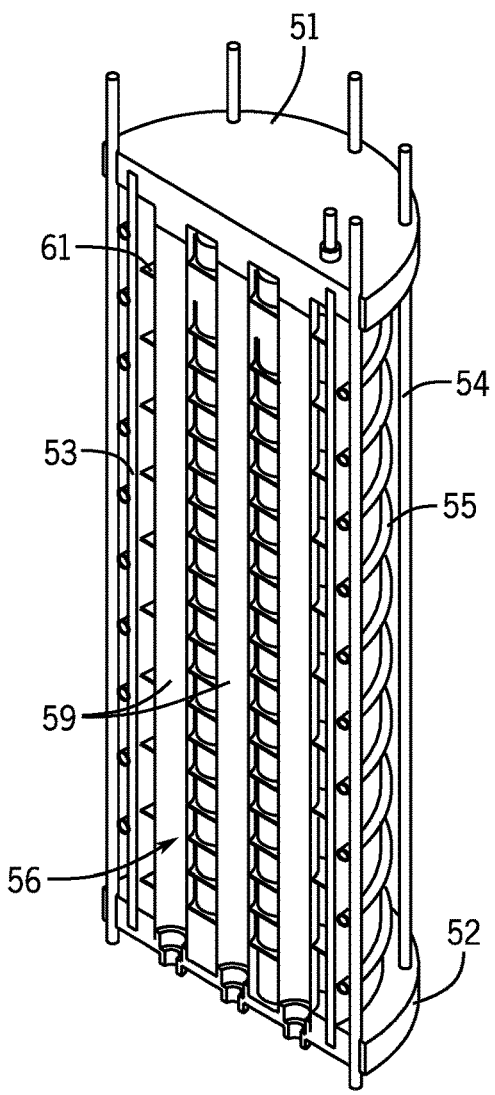
Figure 15:
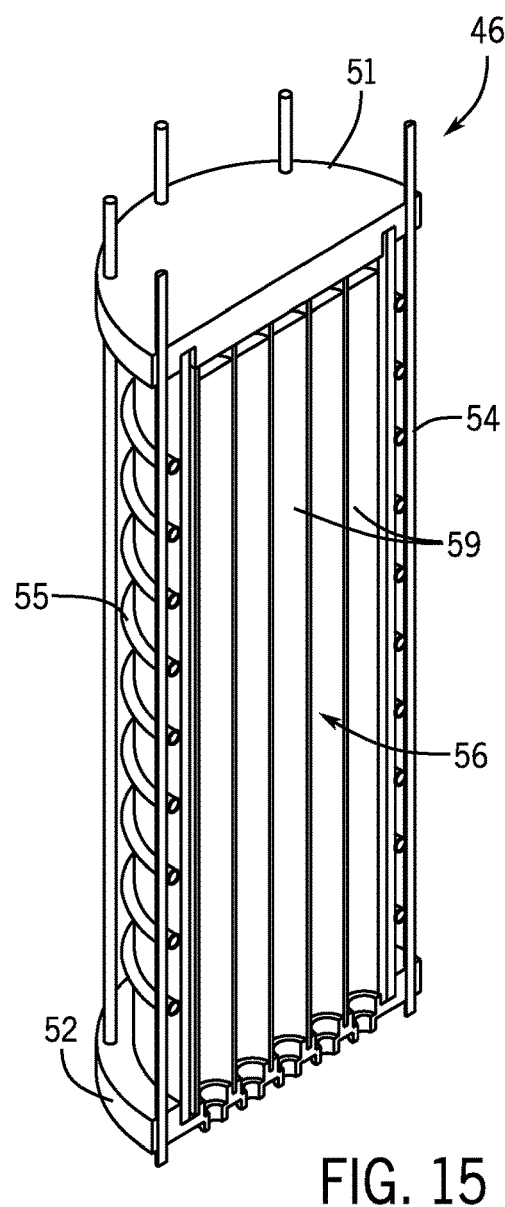
Figure 16:
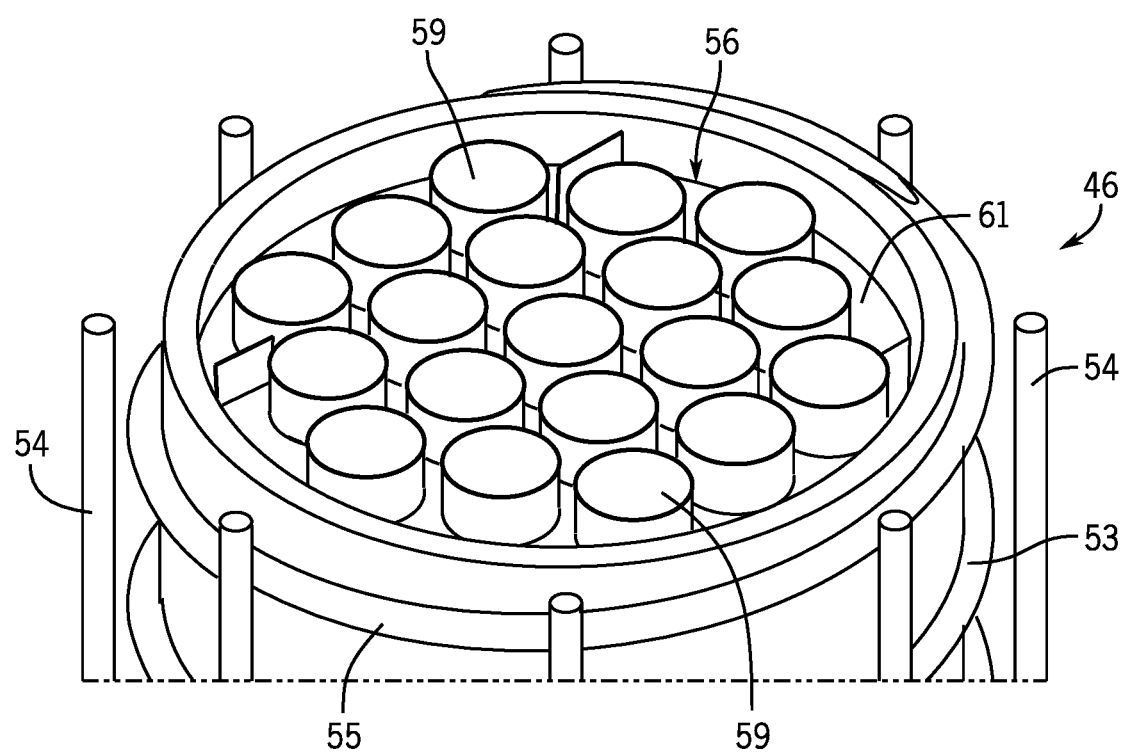
Figure 17:
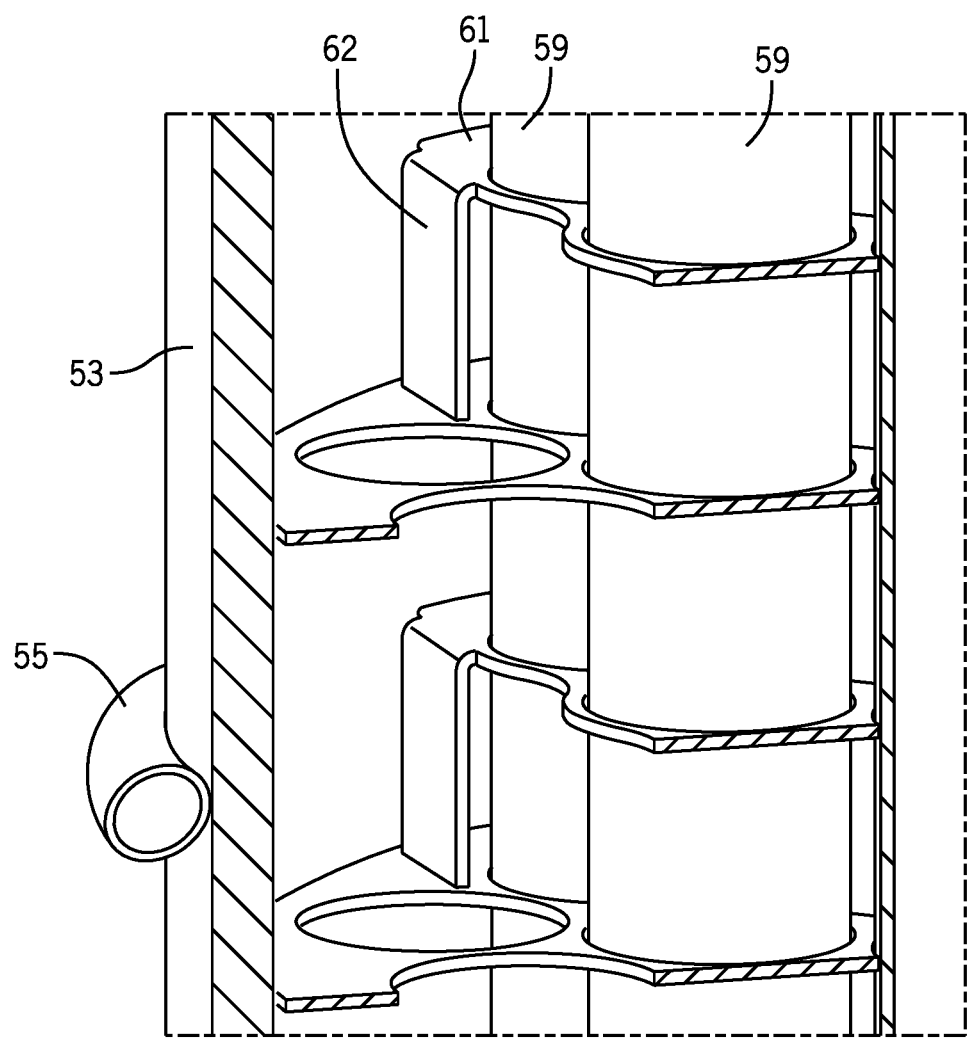
Figure 18:
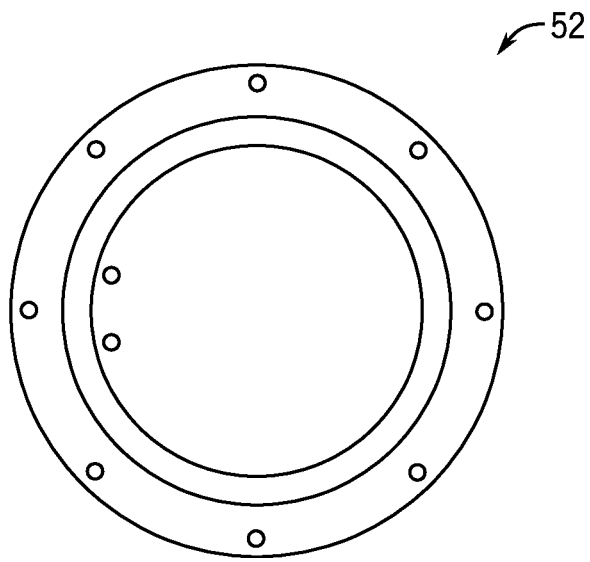
Figure 19:
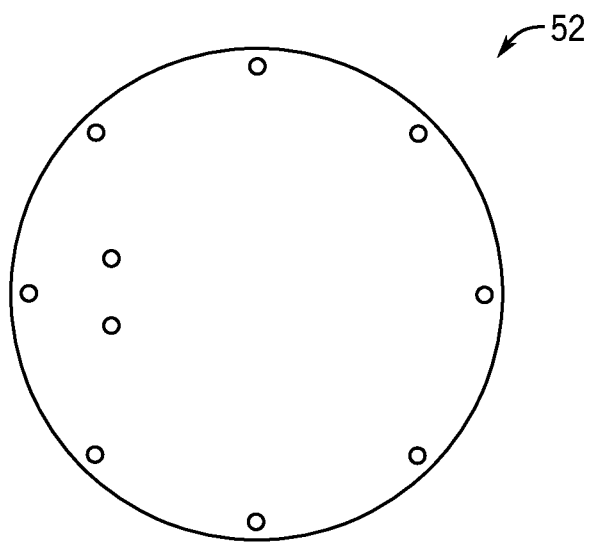

FIGS. 12-21 depict another example heat exchanger according to the present disclosure. The heat exchanger 46 has a top plate 51, an opposing bottom plate 52, and a housing 53 that extends between the plates 51, 52. The plate 51, 52 and the housing 53 are connected together by a plurality of tie bars 54 such that the housing 53 is sandwiched between the plates 51, 52. The housing 53 defines a cylindrical cavity 56 (FIG. 13) in which a plurality of tubes 59 filled with the PCM are positioned. The tubes 59 are held relative to each other in the cavity 56 with spacers 61 (see FIG. 17). The top plate 52 has a base fluid inlet hole 65 and a base fluid outlet hole 64 in the top plate 51 (see FIG. 20) are provided to permit flow of the base fluid into and out of the cavity 56. FIG. 12 depicts barbed fittings 66 in each of the holes 64, 65 that are configured to connect flexible base fluid pipes to the top plate 51. A series of baffles 62 (FIG. 17) are connected to the spacers 61 and are for directing the flow of the base fluid within the cavity 56. An evaporator coil 55 is wound along the exterior surface of the housing 53, and the housing 53 and the evaporator coil 55 are covered with insulation (not shown).

Figure 20:
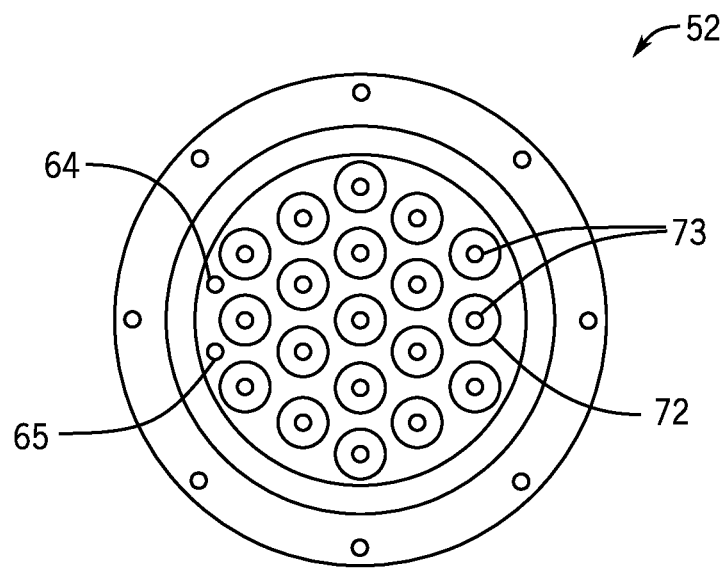
Figure 21:
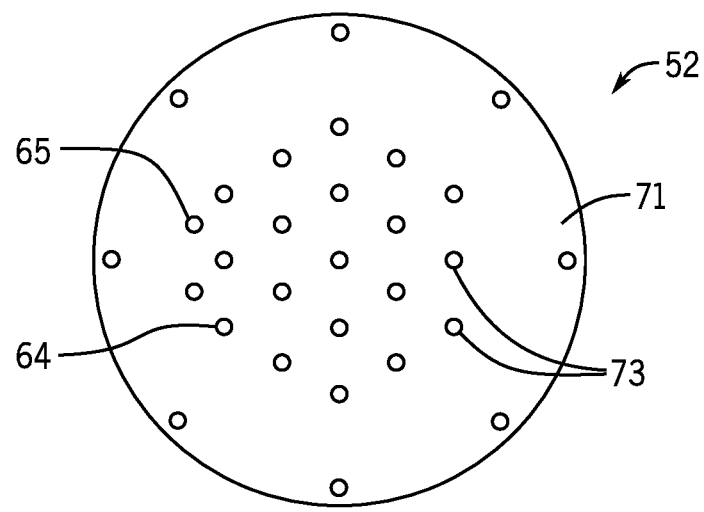
Figure 22:
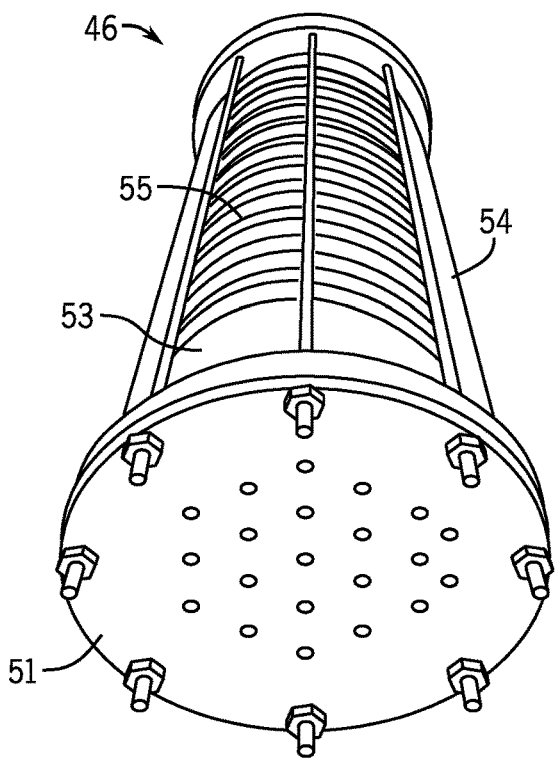
FIGS. 22-25 are views of another example heat exchanger according to the present disclosure.
Figure 23:
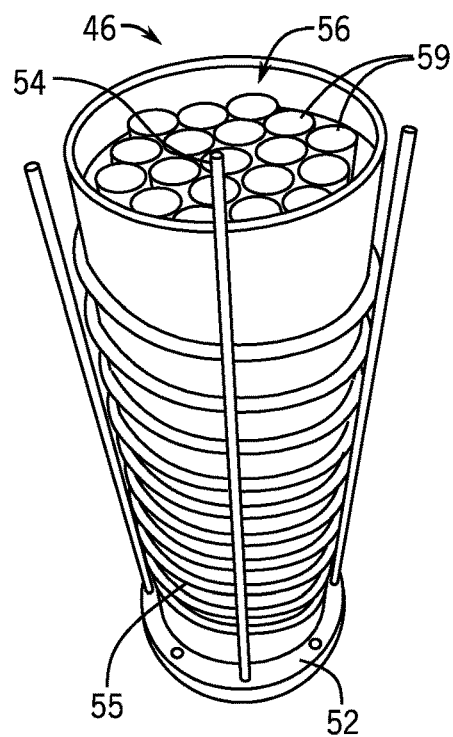
Figure 24:
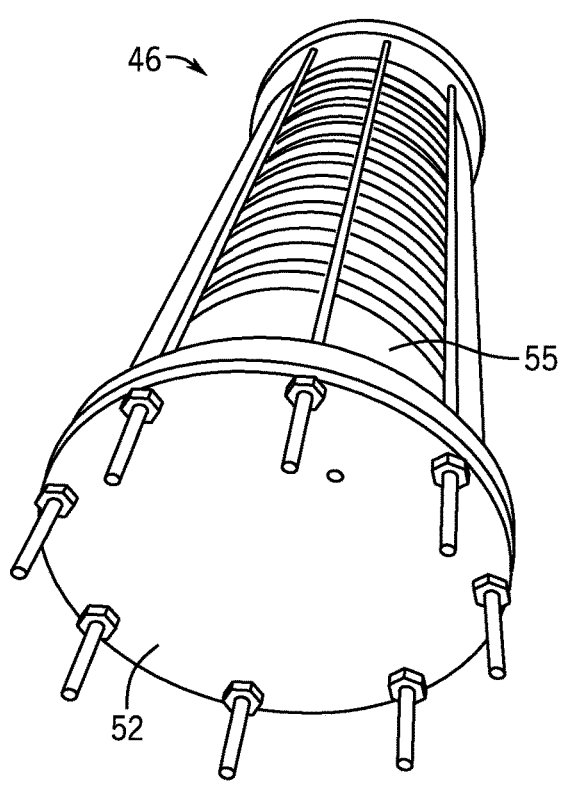
Figure 25:
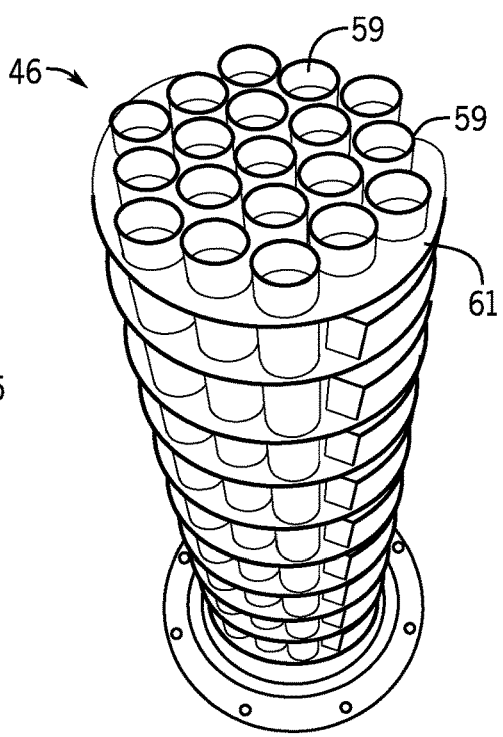

In operation, the base fluid flows into the cavity 56 via the base fluid inlet hole 65 (FIG. 20) and further into the spaces between the tubes 59. The refrigeration system (see example refrigeration system 30 depicted in FIG. 2) circulates refrigerant through the evaporator coil 55 such that the housing 53 and the base fluid in the cavity 56 are cooled. As the base fluid cools, the base fluid cools the PCM in the tubes 59 and the PCM solidifies before the base fluid solidifies. For example, the PCM solidifies at 36.0° F. while the base fluid solidifies near 32.0° F. Thus, the solidified or frozen PCM is a cooling reserve that cools the base fluid in the cavity 56 when the refrigeration system is not operating. For example, once the temperature of the base fluid reaches a preselected minimum temperature sensed by a temperature sensor 205 (FIG. 28), the controller 200 (FIG. 28) shuts off the refrigeration system 30 (FIG. 2). Accordingly, the PCM cools the base fluid in the cavity 56 as the base fluid flows through the heat exchanger 46. When the controller 200 detects, via the temperature sensor 205, that the temperature of base fluid has increased to or above a preselected maximum temperature, the controller 200 activates the refrigeration system 30 to re-cool the base fluid and the PCM. Note that FIGS. 20-21 depict holes 73 in the top plate 51 (through the exterior surface 71 and interior surface 72 of the top plate 51) such that the tubes 59 (FIG. 13) can be filled with the PCM. After the tubes 59 are filled with PCM, the holes 73 are plugged.

The present inventors have recognized that the number of the tubes 59 in the cavity 56, as well as the exterior surface area of the tubes 59 and/or the volume of the PCM of the tubes 59, are important factors for efficiently cooling the base fluid in the example heat exchanger 46 depicted in FIGS. 12-22. For example, the distance or spacing between the tubes 59 and the housing 53 is designed for each specific application of the heat exchanger 46 and/or to the specific PCM utilized in the dispenser 10 to thereby maximize the cooling efficiency of the heat exchanger 46. In certain examples, the cavity 56 is configured to hold 1.0 gallons of PCM in the tubes 59 and 2.0 gallons of base fluid in the cavity 56 between the tubes 59.

The heat exchanger 46 includes baffles 62 (FIG. 17) that direct the base fluid through the cavity 56 in a predetermined path such that the base fluid effectively cools the PCM, the base fluid does not become "stagnant" in one area of the cavity 56, and/or the base fluid does not freeze. In one example, the baffles 62 are arranged to define a vertical serpentine path such that the base fluid flows vertically and from side-to-side in the cavity 68. In another example, the baffles 62 are arranged such that the base fluid flows in a direction generally opposite the direction of flow of the refrigerant. Note that FIGS. 22-25 depict another example heat exchanger 46 that is similar to the heat exchanger 46 described above with respect to FIGS. 12-21.

Figure 26:
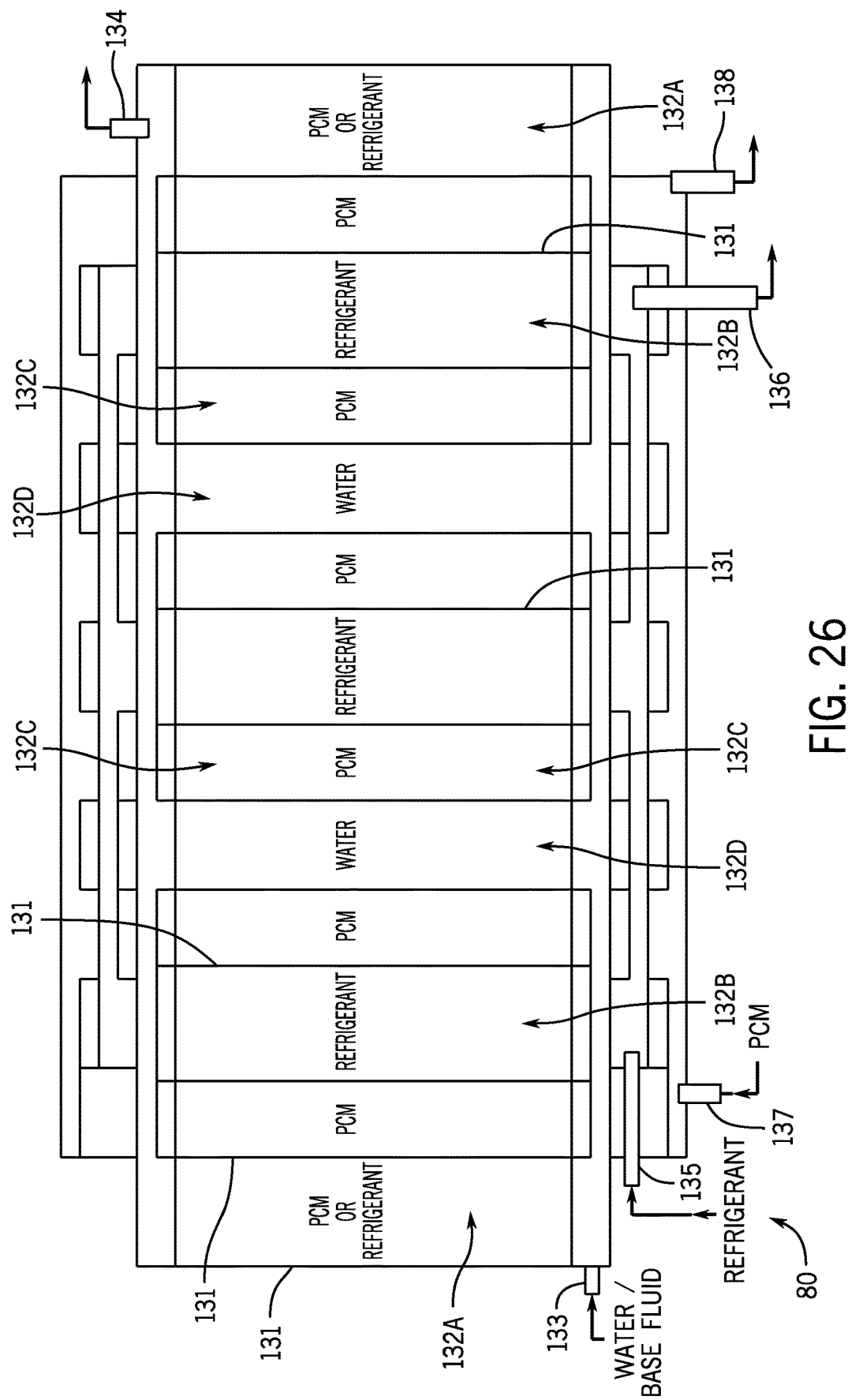
FIG. 26 depicts a schematic diagram of another example heat exchanger according to the present disclosure

FIG. 26 depicts a schematic diagram of another example heat exchanger 80 according to the present disclosure. The heat exchanger 80 is akin to a radiator or manifold and has a plurality of plates 131 that define a plurality of channels 132A-132D therebetween. Each set of channels 132A-132D are filled with one of the refrigerant, the base fluid, and the PCM. For example, first channels 132A are filled with either the refrigerant or the PCM and the first channels 132A are in fluid communication with each other. By locating a layer of PCM or refrigerant on the outermost surfaces of the heat exchanger 80, the base fluid is protected from freezing as well as heat infiltration from the surrounding environment. This is particularly important during idle periods when the base fluid is susceptible to the conditions of the surrounding environment. Second channels 132B are filled with the refrigerant and the second channels 132B are in fluid communication with each other. The heat exchanger 80 has a refrigerant inlet 135 through which the refrigerant is received into the heat exchanger 80 and a refrigerant outlet 136 through which the refrigerant is dispensed from the heat exchanger 80. Channels 132C are filled with the PCM and these channels 132C in fluid communication with each other. A PCM inlet 137 receives the PCM from a PCM storage tank (not shown) and a PCM outlet 138 dispenses the PCM back to the PCM storage tank. A pump (not shown) selectively pumps and thereby circulates the PCM through the heat exchanger 80. In other examples, the channels 132C are filled with PCM and sealed in the channels 132C. Finally, channels 132D are filled with the base fluid and channels 132D are in fluid communication with each other. A base fluid inlet 133 receives the base fluid from the base fluid source (not shown), and the base fluid outlet 134 dispenses the base fluid to the valve assemblies 18 (FIG. 2).

The channels 132A-132D are interdigitated with each other such that the fluids in the channels 132A-132D exchange heat with each other. For example (as depicted in FIG. 26), the channels 132B filled with the refrigerant are sandwiched between the channels 132C filled with the PCM such that heat transfers between the refrigerant and the PCM via the plates 132. Thus, as the refrigerant circulates through the heat exchanger 80, the refrigerant cools the PCM. Similarly, the channels 132D filled with the base fluid are sandwiched between the channels 132C filled with the PCM such that heat transfers between the PCM and the base fluid via the plates 132. Thus, as the base fluid circulates through the heat exchanger 80, the PCM cools the base fluid. Note that the end-most channels 132A that are filled with the base fluid are not sandwiched between channels 132C filled with the PCM. Also, note that the size and shape of the heat exchanger can vary. For example, additional plates 131 and channels 132A-13D can be added to the heat exchanger 80. The size and shape of the plates 131 and the channels 132A-D may be optimized based on the different factors such as the type of the base fluid, the type of the PCM, the freezing temperature of the PCM, the material used to form the plates 131, and/or the like. Thus, the design of the heat exchanger 80 can be tailored to each specific application of the heat exchanger 80. For instance, the surface area of the plates 131 that separate the different types of fluids can be designed to maximize heat transfer between the fluids. In another example, the material thickness of the plates 131 can be designed to maximize heat transfer between the fluids and prevent chemical contamination of the base fluid.

Figure 27:
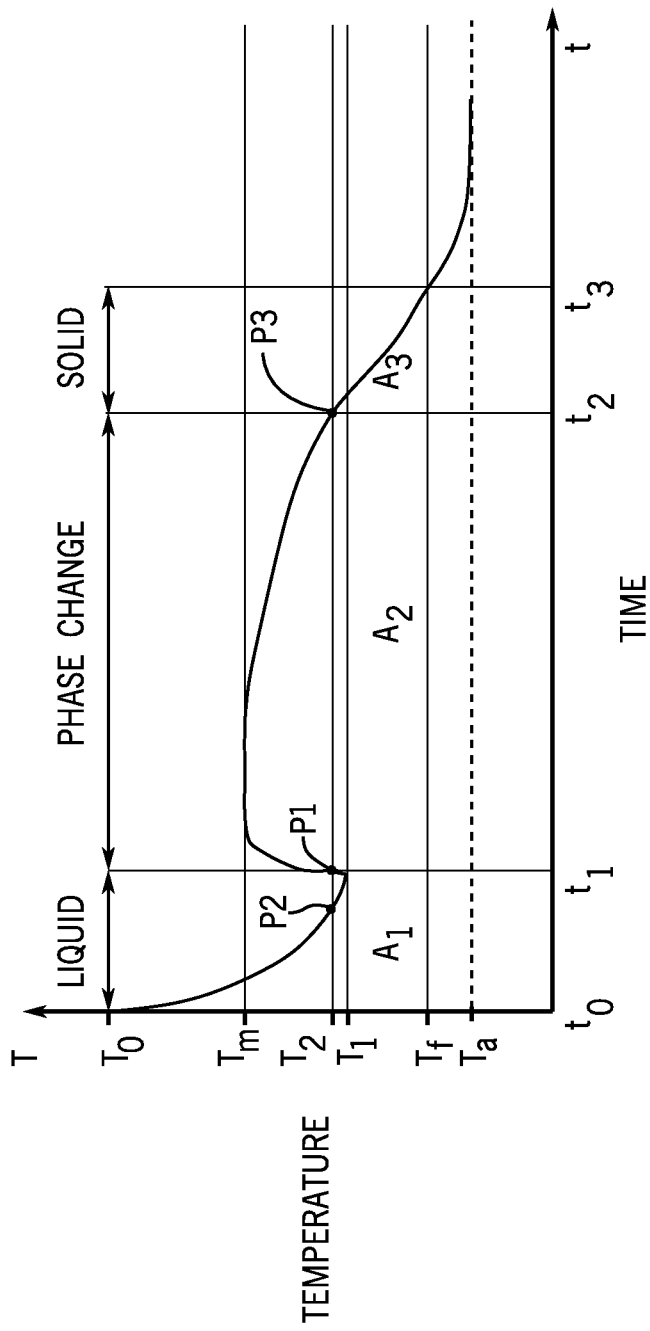
FIG. 27 is a graph that depicts temperature of the PCM as the PCM changes states.

Referring to FIG. 27, the present inventors have recognized that as the refrigerant cools the PCM, the PCM reacts differently than water cooled by refrigerant. FIG. 27 is a temperature/time chart that depicts how PCMs generally react and phase change as the refrigerant cools the PCM. The chart was originally included in a technical paper, which is incorporated herein in its entirety, developed by Entropy Solutions, Inc. entitled "Thermal Characterization of phase change material using the t-history method" (copyright 2015, author Luke Haun, and last publicly accessed on Sep. 26, 2019 at https://www.puretemp.com/stories/t-history-method). In particular, as the refrigerant begins to cool the PCM (starting at time $t_0$), the temperature of the PCM rapidly decreases from an initial PCM temperature $T_0$ to a first PCM temperature $T_1$. The rate of heat transfer (cooling) between the PCM and the refrigerant and temperature decrease begins to level off as the temperature of the PCM approaches a threshold or second PCM temperature $T_2$ (see threshold PCM temperature $T_2$ at time $t_1$). Once the temperature of the PCM reaches (or slightly dips below the threshold PCM temperature $T_2$ as depicted in FIG. 27), the PCM begins to phase change (e.g., from liquid to solid) and the temperature of the PCM rapidly increases (see for example the third temperature $T_M$ after time $t_1$). $T_M$ may be representative of a melting threshold temperature. If the temperature of the PCM exceeds $T_M$ between times $t_1$ and $t_2$, the PCM will return to a liquid state. Once the PCM reaches the third temperature $T_M$, the temperature of the PCM again begins to decrease due to the circulation of the refrigerant through the heat exchanger. As such, the temperature of the PCM gradually decreases from the third temperature $T_M$ (see the period of time between time $t_1$ and $t_2$). Continued circulation of the refrigerant through the heat exchanger continuously cools the PCM such that the temperature of the PCM decreases to and/or dips below the threshold PCM temperature $T_2$. As such, the PCM is in a solid state after time $t_2$. The refrigerant continues to cool the PCM after time $t_2$, however, the temperature of the PCM does not decrease below a fourth temperature $T_a$. Thus, using the refrigerant to cool the PCM after time $t_3$ is inefficient in comparison to using the refrigerant to cool the PCM before time $t_3$. That is, once the PCM is solid (e.g., after time $t_3$ and when the PCM has reached a temperature $T_f$), the cooling capacity does not drastically increase as the refrigerant continues to circulate through the heat exchanger 46. Note that the cooling capacity of the PCM is depicted cumulatively as areas $A_1$, $A_2$, and $A_3$ under the temperature curve and above the fourth temperature $T_a$. Thus, the total cooling capacity of the PCM is equal to the sum of the areas $A_1$, $A_2$, and $A_3$.

As the refrigerant cools the PCM, the temperature of the PCM can be at the threshold PCM temperature at several different times during cooling process depicted in FIG. 27. That is, the PCM is at the threshold PCM temperature $T_2$ two times (see points $P_1$ and $P_3$ on FIG. 28). Note that in certain examples, the PCM is at the threshold PCM temperature $T_2$ an additional third time (see point $P_2$ on FIG. 27) as the refrigerant cools the PCM due to the PCM decreasing just below the threshold PCM temperature $T_2$. Accordingly, when the PCM is used in the beverage dispenser 10 to cool the base fluid, the control or computing system 190 (FIG. 28) should be capable of not only determining or detecting the temperature of the PCM but also determining or detecting the state (e.g., liquid, solid) of the PCM. In this way, the control system 190 can properly control the other components of the beverage dispenser 10, such as the refrigeration system 30 (FIG. 2) the circulates the refrigerant, to thereby efficiently operate the beverage dispenser 10. Note that in certain examples, the control system 190 may determine the phase of the PCM by comparing data from one or more sensors and a timer to a predicted or known temperature graph, such as the graph depicted in FIG. 27. Furthermore, the number of sensors necessary to determine the temperature and/or the phase of the PCM may vary and be based on the PCM utilized in the dispenser 10 and/or the specific application of the dispenser 10.

Figure 28:
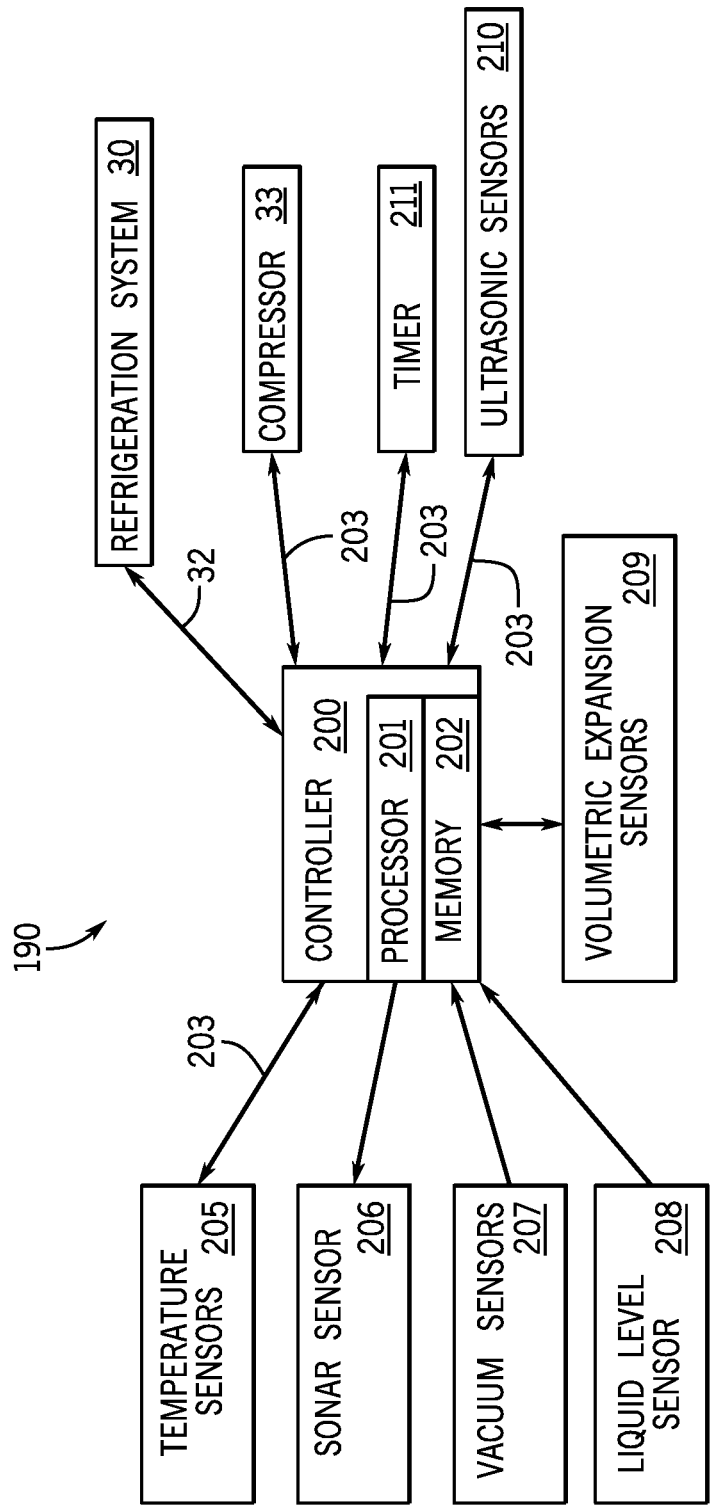
FIG. 28 is a schematic diagram of an example computing system of the present disclosure.

Referring to FIG. 28, an example control system 190 for the beverage dispenser 10 (FIG. 1) is depicted. The control system 190 includes a controller 200 with a processor 201 and a memory 202, and the controller 200 is connected to various components of the beverage dispenser 10 via wired or wireless connection links 203. A timer 211 can be connected to or incorporated with the controller 200. One or more sensors (see also sensor 199 on FIG. 2) are in communication with the controller 200. The sensors can include but are not limited to temperature sensors 205, sonar sensors 206, vacuum sensors 207, liquid level sensors 208, volumetric expansion sensors 209, ultrasonic sensors 210, and/or the like. The sensors are configured to sense one or more characteristics (e.g., temperature, viscosity, density) of the PCM, the refrigerant, and/or the beverage components. In certain examples, these sensors provide data signals to the controller 200 and the controller 200 detects the temperature and/or the phase of the PCM or the refrigerant based on one or more programs, algorithms, lookup tables, graphs, and the like that are stored on the memory 202. In one instance, the controller 200 compares or processes the data signals from the sensors with reference to programs, algorithms, and/or sensor data stored on the memory 202 to detect or determine the temperature and/or phase of the PCM. In certain examples, the controller 200 is configured to store and track the data signals received from the sensors. In certain examples, the algorithms, predetermined threshold temperature, and/or historical data stored on the memory 202 are further utilized by the controller 200 to predict when the PCM will phase change (e.g., a predicted time at which the PCM will change from solid to liquid).

In certain examples, the controller 200 processes or otherwise uses the sensor data to detect or determine, directly or indirectly, the characteristics of the base fluid, the refrigerant, and/or the PCM and further control components of the beverage dispenser 10, such as the compressor 33 (FIG. 2). In one example, a single temperature sensor 205 senses the temperature of the refrigerant after the refrigerant cools the PCM. The controller 200 receives data signals from the temperature sensor 205 and thereby indirectly detects the temperature of the PCM and controls the compressor 33. Note that in certain examples, multiple temperature sensors 205 are in communication with the controller 200 and each temperature sensor 205 provides data signals to the controller 200.

In certain examples, temperature history data and/or historical temperature pattern data related to temperature change of the fluids sensed by the temperature sensors 205 is stored on the memory 202. In one specific example, the controller 200 is configured to control the refrigeration system 30 based on the temperature history data or the historical temperature pattern data stored on the memory 202. In another example, the controller 200 is configured to determine an initial decrease of temperature of the PCM to the threshold PCM temperature $T_2$ (see the threshold PCM temperature $T_2$ at time $t_1$ on FIG. 27) and maintain operation of the refrigeration system 30 at a normal operating state (e.g., the controller 200 "ignores" the initial decrease in temperature of the PCM to the threshold PCM temperature $T_2$). The controller 200 can further be configured to detect a second, subsequent decrease in temperature of the PCM to the threshold PCM temperature $T_2$ (see the threshold PCM temperature $T_2$ at time $t_2$ in FIG. 27) based on the data signals from the sensor 199 (FIG. 2), temperature history data, or historical temperature pattern stored in the memory 202. Accordingly, when the controller 200 determines that the temperature of the PCM decreases to the threshold PCM temperature $T_2$ for a second time, the controller 200 adjusts operation of the refrigeration system 30 (e.g., the controller 200 reduces the flow rate of the refrigerant). Note that in other examples the temperature and/or phase of PCM is indirectly determined by sensing and monitoring the temperature of the refrigerant.

In another example, the controller 200 accounts for or anticipates changes in temperature or phase of the PCM. In another example, the controller 200 monitors the temperature of the refrigerant in the suction line for sharp temperature decreases or increases that may be indicative of a material phase change or state of the PCM. Furthermore, in other examples the controller 200 may account for the temperature of the dispensing base fluid and/or the volume of the base fluid dispensing from the beverage dispenser 10.

Figure 29:
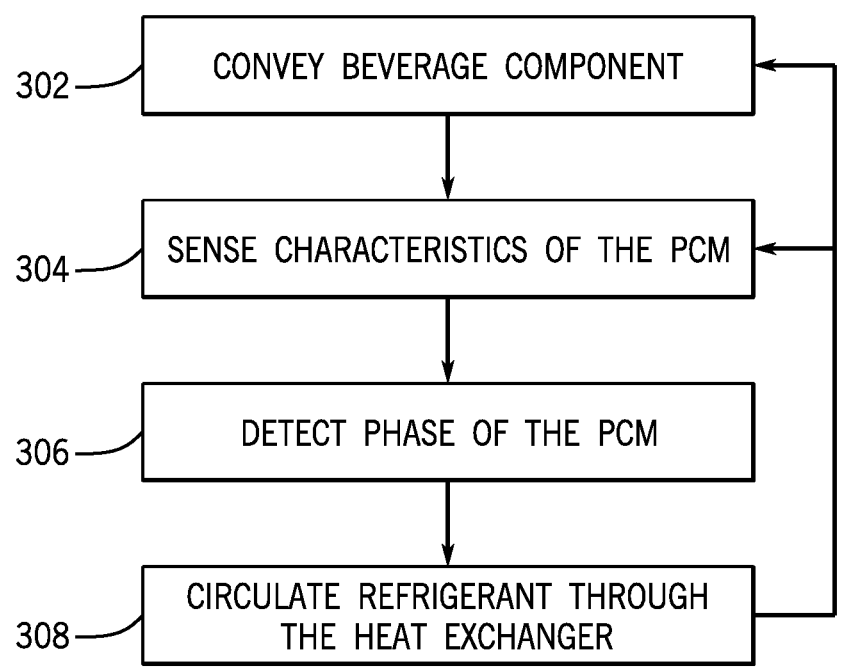
FIG. 29 is an example method for cooling a mixed beverage formed with one or more beverage components according to the present disclosure.

FIG. 29 depicts an example method for cooling a mixed beverage formed with one or more beverage components. The method is further for controlling operation of the refrigeration system 30 and/or the compressor 33 (FIG. 2). As depicted at 302, the method begins with conveying one or more beverage components through the heat exchanger 46 (FIG. 2) having the PCM to cool the beverage component(s). At 304, a sensor 199 (FIG. 2) senses a characteristic of the PCM, such as temperature, viscosity, and/or density. The controller 200 (FIG. 2) receives data signals from the sensor 199 (FIG. 2) and thereby detects a phase (e.g., liquid phase, solid phase, liquid-solid transition phase) of the PCM, at 306. Based on the phase of the PCM, the controller 200 controls the refrigeration system 30 to thereby circulate a refrigerant through the heat exchanger 46 to thereby cool the PCM and the beverage component(s). Note that the method may return to 302 or 304 such that the controller 200 continuously monitors the PCM and adjusts the circulation and/or flow rate of the refrigerant through the heat exchanger 46.

In one example, the method depicted in FIG. 29 may include the steps of comparing the data signals from the sensor 199 (FIG. 2) to historical data, pattern data, and/or predetermined data stored on the memory 202. For instance, if the data from the sensor 204 corresponds to historical temperature pattern data stored on the memory 202, the controller 200 may control the compressor 33 to increase or decrease the flow rate of the refrigerant through the refrigeration system 30 (FIG. 2). In another example, the sensor 199 (FIG. 2) is an ultrasonic sensor configured to sense the phase of the PCM. In another example, the sensor 199 (FIG. 2) is a temperature sensor configured to sense the temperature of the PCM. In certain examples, detecting the phase of the PCM includes comparing the sensed temperature of the PCM to the threshold PCM temperature $T_2$ (see FIG. 27). In certain examples, when the sensed temperature of the PCM is equal to the threshold PCM temperature $T_2$, the compressor 33 circulates the refrigerant a predetermined duration of time (e.g., 30.0 seconds, 1.0 minutes, 5.0 minutes) to thereby cool the PCM.

Figure 30:
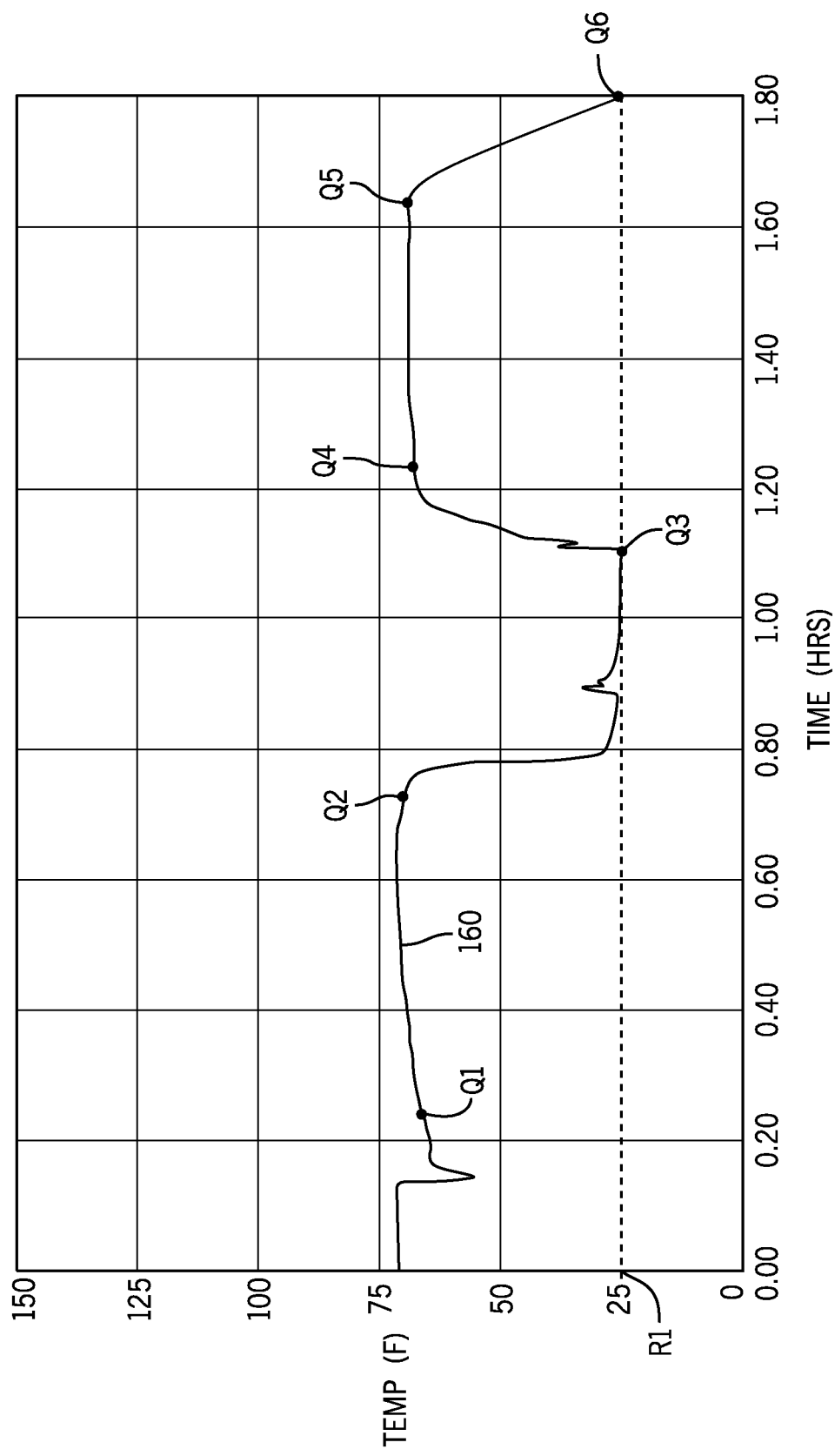
FIG. 30 is a graph that depicts temperature of refrigerant entering the compressor after cooling the PCM.

Turning now to FIG. 30, line 160 depicts a temperature graph/plot of the refrigerant entering the compressor 33 (e.g., suction temperature) after the refrigerant is circulated through the heat exchanger 46 (FIG. 2) to cool the PCM. Between time $Q_1$ and $Q_2$, the temperature of the refrigerant is relatively constant and corresponds to cooling the PCM while the PCM is in the liquid state (see temperature and phase of the PCM between time $t_0$ and $t_1$ on FIG. 27). Between times $Q_2$ and $Q_3$, the temperature of the refrigerant decreases as less heat is transferred from the PCM to the refrigerant due to the PCM approaching the point (see time $t_1$ on FIG. 27) at which the PCM begins to phase change from liquid to solid (see FIG. 27). For example, the temperature of the refrigerant approaches and/or does not decrease below a threshold minimum refrigerant temperature $R_1$. Note that in this example the threshold minimum refrigerant temperature $R_1$ is 25.0° F. However, between times $Q_3$ and $Q_4$, the temperature of the refrigerant increases or "spikes" as the PCM increases in temperature due to the PCM beginning to phase change from liquid to solid (see after time $t_1$ on FIG. 27). As such, between times $Q_3$ and $Q_4$ the temperature of the refrigerant rapidly increases as more heat is transferred from the PCM to the refrigerant (e.g., the refrigerant draws more heat out of the PCM). Between times $Q_4$ and $Q_5$, the refrigerant continuously cools the PCM and therefore the temperature of the refrigerant is relatively constant as the PCM is cooled and approaches the threshold PCM temperature $T_2$ (see time $t_2$ and point $P_3$ on FIG. 27).

After time $Q_5$, the temperature of the refrigerant begins to again decrease as the temperature of the PCM falls below the threshold PCM temperature $T_2$ (see point $P_3$ near time $t_2$ on FIG. 27). As such, the temperature of the refrigerant approaches the threshold refrigerant temperature $R_1$ (FIG. 30) and reaches the threshold minimum refrigerant temperature $R_1$ at time $Q_6$ when the temperature of the PCM approaches the fourth temperature $T_a$ (see FIG. 27). Note that sensing the temperature of the refrigerant, as depicted in FIG. 30, is an indirect method of determining the temperature and/or the phase (e.g., solid, liquid) of the PCM. However, as noted above, the present inventors have recognized that the temperature of the refrigerant may have identical temperatures at different times when cooling the PCM and as the PCM changes phases. Thus, the present inventors have developed control systems 190 and methods thereof for sensing the temperature of the PCM and/or refrigerant and detecting the state of the PCM such that the refrigeration system 30 (FIG. 2) can be efficiently operated.

Figure 31:
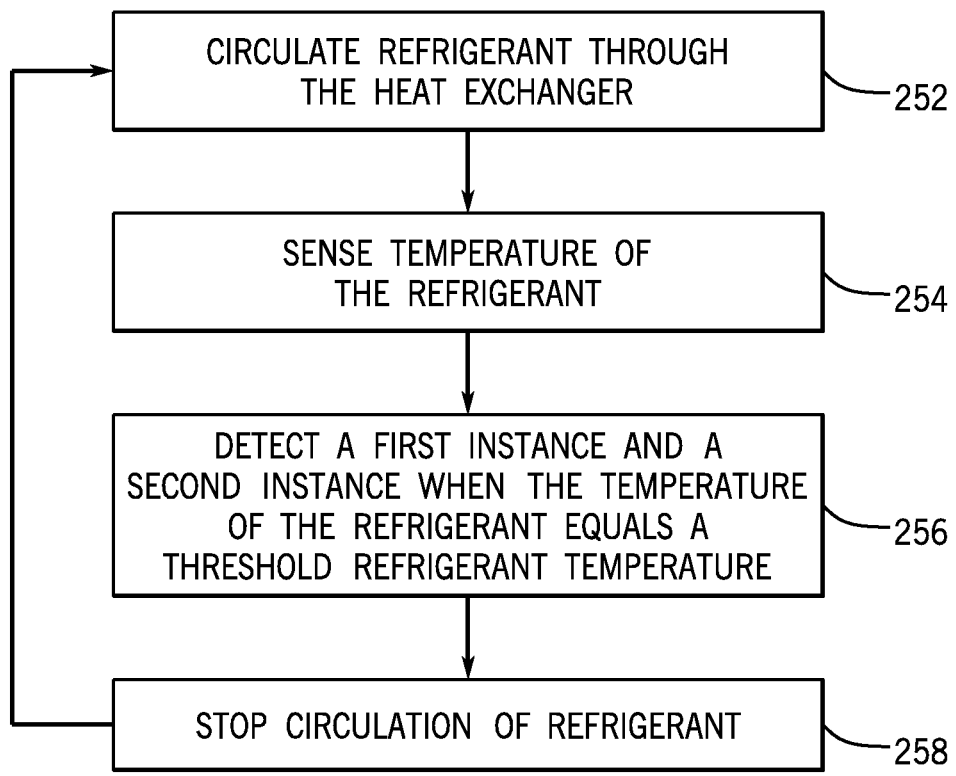
FIG. 31 is another example method for cooling a mixed beverage formed with one or more beverage components according to the present disclosure.

FIG. 31 depicts an example method for cooling a mixed beverage formed with one or more beverage components. The method is further for controlling operation of the refrigeration system 30 and/or the compressor 33 (FIG. 2). As depicted at 252, the method begins circulating the refrigerant through the heat exchanger 46 (FIG. 2) having the PCM to cool one or more beverage components. At 254, a sensor 199 (FIG. 2) senses the temperature of the refrigerant. The controller 200 (FIG. 2) receives data signals from the sensor 199 (FIG. 2) and thereby detects, at 256, a first instance when the sensed temperature of the refrigerant equals the threshold refrigerant temperature $R_1$ (see time $Q_3$ on FIG. 30) and a second instance when the sensed temperature of the refrigerant equals the threshold refrigerant temperature $R_1$ (see time $Q_6$ on FIG. 30). Note that in certain examples, the temperature of the refrigerant increases between the first instance and the second instance, as depicted in FIG. 30. When the second instance is detected, the controller 200 controls the compressor 33 to thereby stop circulation of the refrigerant, at 258. In other examples, the controller 200 controls the compressor 33 to stop the circulation of the refrigerant when the sensed temperature of the refrigerant begins to decrease, thus indicating that the PCM has reached a fully solid state (see time $Q_5$ on FIG. 30). By stopping the compressor 33 after time $Q_5$, excess subcooling of the PCM is prevented, which could lead to energy inefficiencies and refrigerant floodback that damages the compressor 33.

In one example, the step 252 of circulating the refrigerant through the heat exchanger 46 (FIG. 2) may include continuously circulating the refrigerant after the first instance is detected. In other examples, the method includes the step of decreasing or increasing flow rate of the refrigerant after the first instance is detected by the controller 200. In certain examples, the compressor 33 (FIG. 2) circulates the refrigerant through the heat exchanger 46 and wherein upon detecting the first instance, the compressor 33 increases the flow rate of the refrigerant circulated through the heat exchanger 46. In certain examples, the method includes the step of increasing the flow rate of the refrigerant when the sensed temperature of the refrigerant is greater than the threshold refrigerant temperature $R_1$ (see FIG. 30).

Figure 32:
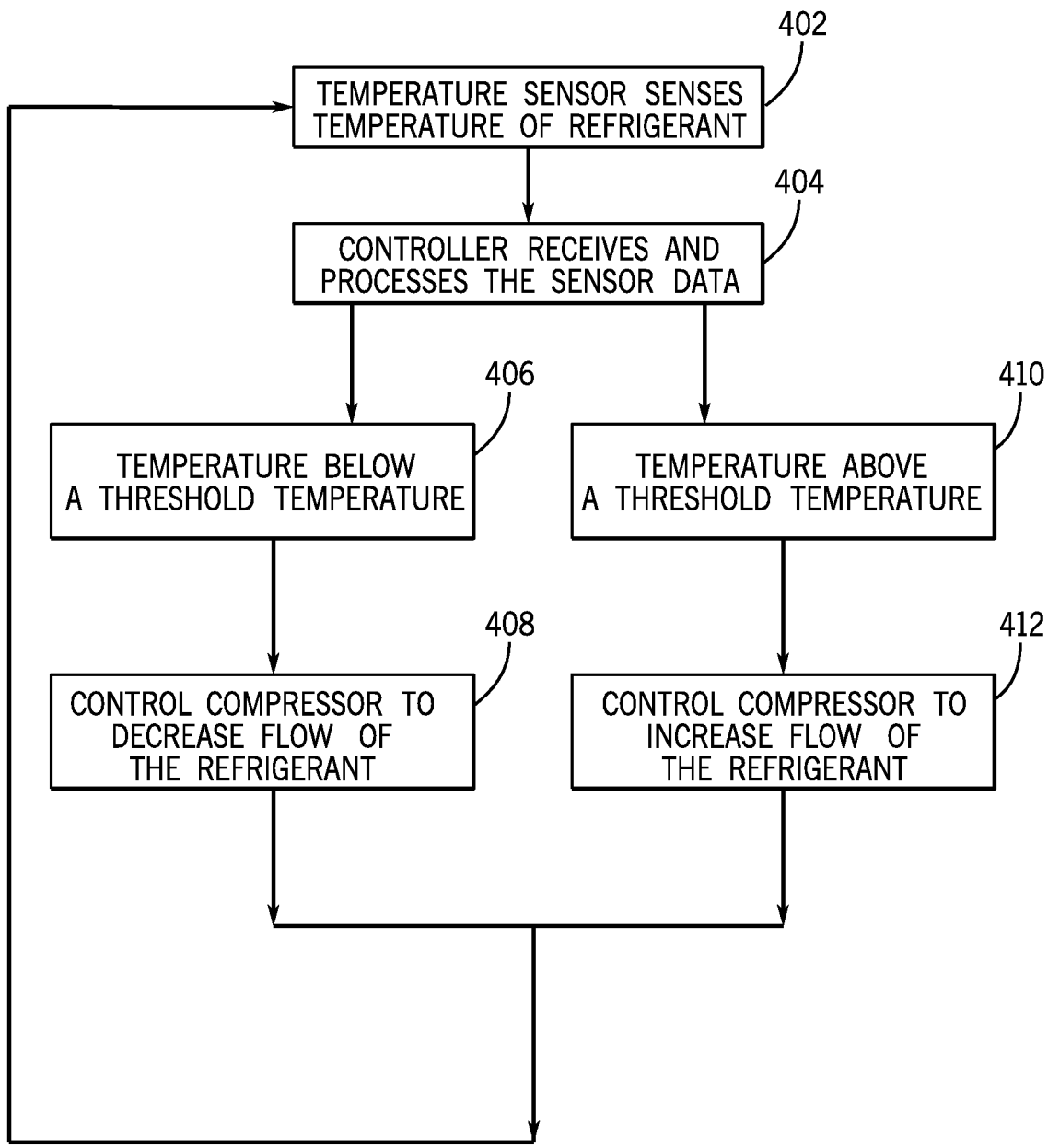
FIG. 32 is an example method for controlling operation of a compressor according to the present disclosure.

Referring to FIG. 32, an example method for controlling operation of the compressor 33 (FIG. 2) and indirectly determining the temperature and/or phase of the PCM based on the temperature of the refrigerant is depicted. As depicted at 402, the method begins with a temperature sensor 205 (FIG. 28) sensing a temperature of the refrigerant entering the compressor 33. The controller 200 (FIG. 28) receives the data signals from the temperature sensor 205 and processes the data signals, depicted at 404. If the controller 200 detects that the temperature of the refrigerant is at the threshold refrigerant temperature $R_1$ (see FIG. 30) at 406, the controller 200 controls the compressor 33 to decrease the flow rate of the refrigerant through the heat exchanger 46 (FIG. 2), depicted at 408. If the controller 200 detects that the temperature of the refrigerant is above threshold refrigerant temperature $R_1$ (see FIG. 30) at 410, the controller 200 controls the compressor 33 to increase the flow rate of the refrigerant (e.g., the compressor 33 pumps that the refrigerant) through the heat exchanger 46 (FIG. 2), depicted at 412. Note that in certain examples, the flow rate of the refrigerant can only be increased to a maximum flow rate of the compressor 33.

The method returns to 402 such that the controller 200 continuously monitors the temperature of the refrigerant and adjusts the flow rate of the refrigerant through the heat exchanger 46 (FIG. 2) accordingly. In certain examples, the method may include the steps of comparing the data signals to temperature history data and/or historical temperature pattern data stored on the memory 202 (FIG. 28). For instance, if the sensor data received by the controller 200 corresponds to historical temperature pattern data stored on the memory 202, the controller 200 controls the compressor 33 to decrease the flow rate of the refrigerant through the refrigeration system 30 (FIG. 2).

Figure 33:
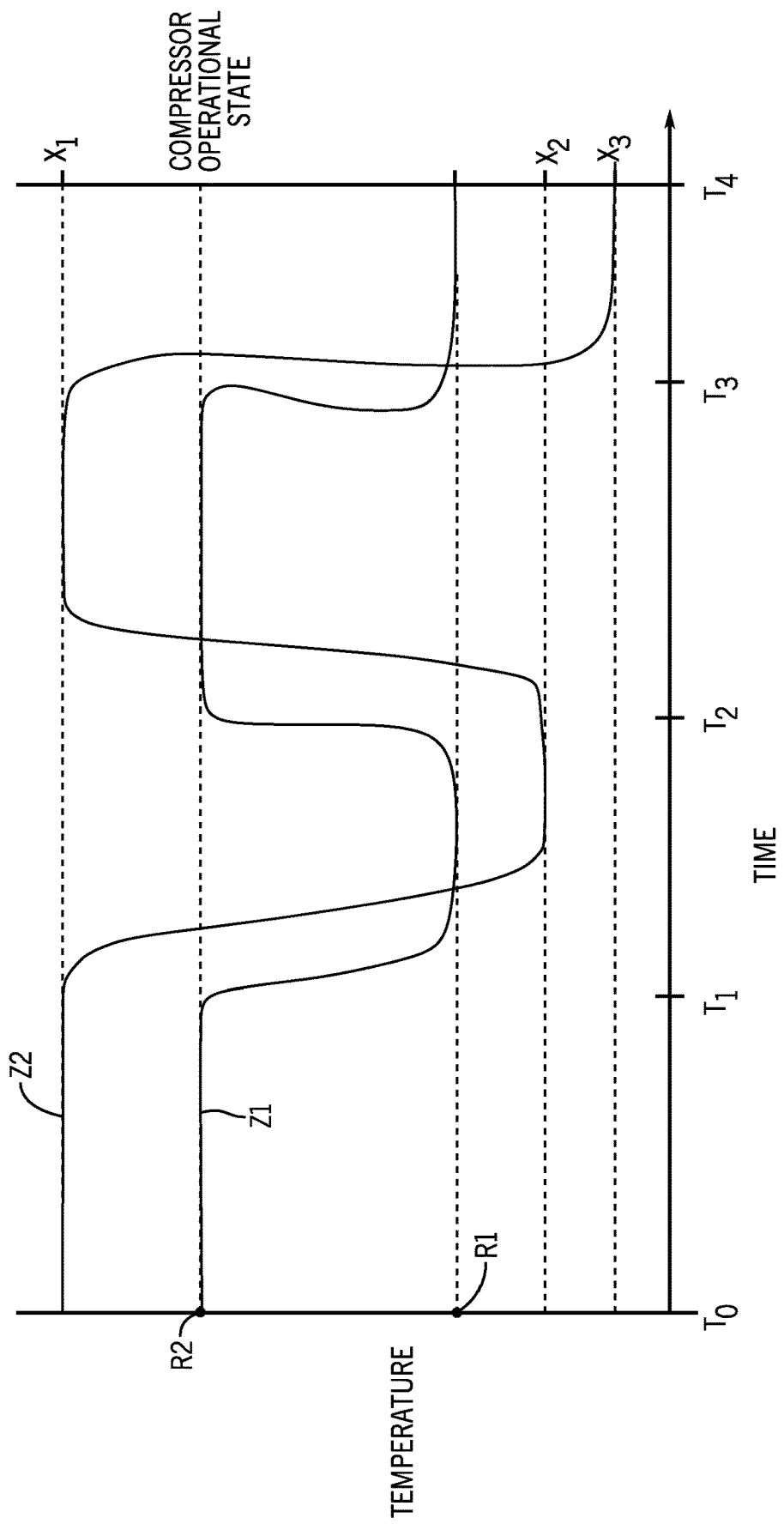
FIG. 33 depicts an example process for controlling an example refrigeration system according to the present disclosure.

FIG. 33 depicts an example process for controlling an example refrigeration system 30 (FIG. 2) of the present disclosure with the controller 200 (FIG. 28). Line $Z_1$ depicts the temperature of the refrigerant over time (times $T_1$-$T_4$) as the refrigerant cools the PCM. Note that a high first temperature $R_2$ of the refrigerant is depicted in FIG. 33 and a lower, second temperature $R_1$ of the refrigerant is depicted in FIG. 33. In this example, the compressor 33 (FIG. 2) is operated by the controller 200 (FIG. 2) and a temperature sensor 205 (FIG. 28) sends data signals to the controller 200. Between time $T_0$ and $T_1$, the compressor 33 is operating in a high first operating state $X_1$. Note that line $Z_2$ depicts operation of the compressor 33 at various operational states such as a first operating state $X_1$ that may correspond to the compressor 33 conveying the refrigerant at a high flow rate, a second operating state $X_2$ that may correspond to the compressor 33 conveying the refrigerant at a low flow rate, and a third operating state $X_3$ that may correspond to the compressor conveying the refrigerant at a zero flow rate.

When the controller 200 detects, via the temperature sensor 205, that the temperature of the refrigerant is beginning to decrease at time $T_1$, the controller 200 controls the compressor 33 to thereby decrease the flow rate of the refrigerant from the compressor 33 to the second operating state $X_2$ and prevent the refrigerant from disadvantageously flooding the evaporator coil 32 (FIG. 2). Note that in this example the compressor 33 is variable compressor.

When the controller 200 detects, via the temperature sensor 205, that the temperature of the refrigerant is beginning to increase at time $T_2$, the controller 200 controls the compressor 33 to increase the flow rate of the refrigerant from the compressor 33 to the first operating state $X_1$ as the PCM changes phase. When the controller 200 detects, via the temperature sensor 205, that the temperature of the refrigerant against begins to decrease at time $T_3$ (e.g., the decrease in the temperature of the refrigerant may correspond to the PCM phase changing to a solid), the controller 200 controls the compressor 33 to thereby decrease the flow rate of the refrigerant from the compressor 33 to zero at the third operating state $X_3$.

Note that the action of the controller 200 to increase or decrease of the flow rate of the refrigerant from the compressor 33 is reactionary or occurring after a change in temperature is detected by the controller 200. However, in other examples the controller 200 may anticipate the changes in temperature (e.g., based on other sensors, historical data sets, and the like) and thereby the controller 200 controls the compressor 33 to decrease or increase the flow rate of the refrigerant before the temperature change of the refrigerant actually occurs. Thus, the controller 200 maximizes the efficiently of the compressor 33 and/or the refrigeration system 30 (FIG. 2) to cool the beverage component(s) and the PCM.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for cooling a mixed beverage formed with one or more beverage components, the method comprising:
   circulating a refrigerant through a heat exchanger having a phase change material to cool a beverage component;
   sensing a temperature of the refrigerant;
   detecting a first instance when the sensed temperature of the refrigerant equals a threshold refrigerant temperature, the first instance being indicative of the phase change material transitioning from a liquid state to a phase change state;
   detecting a second instance when the sensed temperature of the refrigerant equals the threshold refrigerant temperature, the second instance being indicative of the phase change material transitioning from the phase change state to a solid state; and
   stopping circulation of the refrigerant when the second instance is detected.

2. The method according to claim 1, wherein the circulating the refrigerant through the heat exchanger includes continuously circulating the refrigerant after the first instance is detected.

3. The method according to claim 1, further comprising decreasing or increasing a flow rate of the refrigerant after the first instance is detected.

4. The method according to claim 1, wherein a compressor circulates the refrigerant, and wherein upon detecting the first instance, the compressor increases a flow rate of the refrigerant circulating through the heat exchanger.

5. The method according to claim 1, further comprising increasing, with a compressor, a flow rate of the refrigerant when the sensed temperature of the refrigerant is greater than the threshold refrigerant temperature.

6. The method according to claim 1, wherein the sensed temperature of the refrigerant increases between the first instance and the second instance.

7. A method for cooling a mixed beverage formed with one or more beverage components, the method comprising:
   conveying a beverage component through a heat exchanger having a phase change material to cool the beverage component;
   sensing a characteristic of the phase change material;
   detecting a phase of the phase change material; and
   circulating a refrigerant through the heat exchanger based on the phase of the phase change material to thereby cool the phase change material and the beverage component.

8. The method according to claim 7, wherein sensing the characteristic of the phase change material includes sensing a phase of the phase change material.

9. The method according to claim 8, wherein an ultrasonic sensor senses the phase of the phase change material.

10. The method according to claim 7, wherein sensing the characteristic of the phase change material includes sensing a temperature of the phase change material.

11. The method according to claim 10, wherein the detecting the phase of the phase change material includes comparing the sensed temperature of the phase change material to a threshold phase change material temperature.

12. The method according to claim 11, wherein when the sensed temperature of the phase change material is equal to a threshold refrigerant temperature, the refrigerant is circulated for a predetermined duration of time to thereby cool the phase change material.

13. The method according to claim 7, wherein the phase change material has a freezing point that is greater than 32.0 degrees Fahrenheit.

14. A dispenser for dispensing a mixed beverage, the dispenser comprising:
   a heat exchanger having a phase change material, the heat exchanger configured to cool one or more beverage components that are mixed to form the mixed beverage;
   a refrigeration system configured to cool a refrigerant and circulate the refrigerant through the heat exchanger to cool the one or more beverage components;
   a sensor configured to sense a characteristic of the phase change material; and
   a controller operably coupled to the refrigeration system and configured to control the refrigeration system to circulate the refrigerant based on the characteristic of the phase change material.

15. The dispenser according to claim 14, wherein the sensor is a temperature sensor that senses a temperature of the phase change material.

16. The dispenser according to claim 15, wherein when the temperature of the phase change material is greater than a threshold phase change material temperature, the controller causes the refrigeration system to circulate the refrigerant.

17. The dispenser according to claim 14, wherein the phase change material has a freezing point that is greater than 32.0 degrees Fahrenheit.

18. The dispenser according to claim 14, wherein the sensor senses a phase of the phase change material.

19. The dispenser according to claim 14, wherein the sensor senses a viscosity of the phase change material.

20. A dispenser for dispensing a mixed beverage, the dispenser comprising:
   a heat exchanger having a phase change material, the heat exchanger configured to cool one or more beverage components that are mixed to form the mixed beverage;
   a refrigeration system configured to cool a refrigerant and circulate the refrigerant through the heat exchanger to cool the one or more beverage components;
   a sensor configured to sense a temperature of the refrigerant; and
   a controller operably coupled to the refrigeration system and configured to control the refrigeration system to circulate the refrigerant based on the temperature of the refrigerant.

21. The dispenser according to claim 20, wherein the phase change material has a freezing point that is greater than 32.0 degrees Fahrenheit.

22. The dispenser according to claim 20, wherein when a temperature of the phase change material is greater than a threshold refrigerant temperature, the controller causes the refrigeration system to circulate the refrigerant.

23. A dispenser for dispensing a mixed beverage, the dispenser comprising:
- a heat exchanger configured to cool one or more beverage components that are mixed to form the mixed beverage, the heat exchanger comprising:
  - a housing defining a cylindrical cavity;
  - a plurality of tubes disposed within the cylindrical cavity, each of the plurality of tubes filled with a phase change material;
  - a plurality of baffles disposed within the cylindrical cavity and between the plurality of tubes, the plurality of baffles configured to direct flow of the one or more beverage components through the housing; and
  - an evaporator coil wound along an exterior surface of the housing, wherein a refrigerant is configured to flow through the evaporator coil to cool the phase change material in the plurality of tubes;
- a refrigeration system configured to cool the refrigerant and circulate the refrigerant through the evaporator coil;
- a controller operably coupled to the refrigeration system and configured to control a flow rate of the refrigerant through the evaporator coil; and
- a valve assembly fluidly coupled to the heat exchanger and configured to dispense the mixed beverage.

24. The dispenser of claim 23, further comprising a sensor configured to sense a characteristic of the refrigerant or the phase change material.

25. The dispenser of claim 24, wherein the controller is configured to control the flow rate of the refrigerant through the evaporator coil based on the characteristic of the refrigerant or the phase change material.

* * * * *